United States Patent
Lieb et al.

(10) Patent No.: US 11,816,793 B2
(45) Date of Patent: Nov. 14, 2023

(54) GEOSPATIAL MODELING SYSTEM PROVIDING 3D GEOSPATIAL MODEL UPDATE BASED UPON ITERATIVE PREDICTIVE IMAGE REGISTRATION AND RELATED METHODS

(71) Applicant: EAGLE TECHNOLOGY, LLC, Melbourne, FL (US)

(72) Inventors: Donald Alan Lieb, Melbourne, FL (US); Bill Watkins, Melbourne Beach, FL (US); Glenn Boudreaux, Melbourne, FL (US); John L. Delay, Liberty Township, OH (US); Mark D. Elstrom, Melbourne, FL (US); Mark D Rahmes, Melbourne, FL (US); Patrick Cowhill, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 216 days.

(21) Appl. No.: 17/142,329

(22) Filed: Jan. 6, 2021

(65) Prior Publication Data
US 2022/0215619 A1    Jul. 7, 2022

(51) Int. Cl.
*G06T 17/05*    (2011.01)
*G06T 7/35*    (2017.01)
(Continued)

(52) U.S. Cl.
CPC ............... *G06T 17/05* (2013.01); *G01W 1/10* (2013.01); *G06N 3/04* (2013.01); *G06N 3/08* (2013.01);
(Continued)

(58) Field of Classification Search
None
See application file for complete search history.

(56) References Cited

U.S. PATENT DOCUMENTS 7,194,389 B2    3/2007 Damron
7,528,938 B2    5/2009 Garceau et al.
(Continued)

FOREIGN PATENT DOCUMENTS

| EP | 2549434 | 1/2013 |
|---|---|---|
| FR | 2978276 | 1/2013 |
| JP | 4719753 | 7/2011 |

OTHER PUBLICATIONS

U.S. Appl. No. 17/030,501; filed Sep. 24, 2020 Delay et al.
(Continued)

*Primary Examiner* — James A Thompson
(74) *Attorney, Agent, or Firm* — ALLEN, DYER, DOPPELT, GILCHRIST, P.A.

(57) ABSTRACT

A geospatial modeling system may include a memory and a processor cooperating therewith to: (a) generate a three-dimensional (3D) geospatial model including geospatial voxels based upon a plurality of geospatial images; (b) select an isolated geospatial image from among the plurality of geospatial images; (c) determine a reference geospatial image from the 3D geospatial model using Artificial Intelligence (AI) and based upon the isolated geospatial image; (d) align the isolated geospatial image and the reference geospatial image to generate a predictively registered image; (e) update the 3D geospatial model based upon the predictively registered image; and (f) iteratively repeat (b)-(e) for successive isolated geospatial images.

24 Claims, 33 Drawing Sheets

(51) Int. Cl.
*G06N 3/04* (2023.01)
*G01W 1/10* (2006.01)
*G06N 3/08* (2023.01)
*G06Q 50/26* (2012.01)
*G06Q 10/067* (2023.01)

(52) U.S. Cl.
CPC .............. *G06T 7/35* (2017.01); *G06Q 10/067* (2013.01); *G06Q 50/26* (2013.01); *G06T 2200/08* (2013.01)

(56) References Cited

U.S. PATENT DOCUMENTS

| | | | |
|---|---|---|---|
| 7,983,474 | B2 | 7/2011 | Van Workum et al. |
| 8,427,505 | B2 | 4/2013 | Karp et al. |
| 8,433,457 | B2* | 4/2013 | Garceau .................. G06T 7/001 700/1 |
| 9,396,583 | B2 | 7/2016 | Barthelet et al. |
| 9,482,528 | B2 | 11/2016 | Baker et al. |
| 9,916,679 | B2 | 3/2018 | Flynn et al. |
| 9,934,453 | B2 | 4/2018 | Hammoud et al. |
| 9,947,128 | B2 | 4/2018 | Korb et al. |
| 10,311,302 | B2 | 6/2019 | Kottenstette et al. |
| 10,489,971 | B2 | 11/2019 | Ryde et al. |
| 10,894,215 | B1* | 1/2021 | Brown ..................... A63F 13/35 |
| 11,436,389 | B2* | 9/2022 | Santarone ............. G06T 19/006 |
| 2012/0229607 | A1 | 9/2012 | Baker et al. |
| 2019/0213412 | A1 | 7/2019 | Kottenstette et al. |
| 2019/0251694 | A1 | 8/2019 | Han et al. |
| 2019/0303725 | A1 | 10/2019 | Gurvich et al. |
| 2020/0020072 | A1 | 1/2020 | Ely |
| 2020/0034654 | A1 | 1/2020 | Mansi et al. |
| 2021/0019571 | A1* | 1/2021 | Deskevich ........... G06K 9/6262 |
| 2022/0058859 | A1* | 2/2022 | Casallas Suarez ..... G06T 15/04 |

OTHER PUBLICATIONS

U.S. Appl. No. 17/030,600; filed Sep. 24, 2020 Boudreaux et al.
U.S. Appl. No. 17/030,553; filed Sep. 24, 2020 Boudreaux et al.
U.S. Appl. No. 17/030,529; filed Sep. 24, 2020 Hucks, et al.
U.S. Appl. No. 17/142,338; filed Jan. 6, 2021 Lieb et al.
Ma et al. "Deep learning in remote sensing applications: A meta-analysis and review" ISPRS Journal of Photogrammetry and Remote Sensing 152 (2019) 166-177 https://www.sciencedirect.com/science/article/pii/S0924271619301108.
Nie et al. "MMJN: Multi-Modal Joint Networks for 3D Shape Recognition" MM '19: Proceedings of the 27th ACM International Conference on Multimedia; Oct. 2019 https://dl.acm.org/doi/10.1145/3343031.3351009 Abstract Only.
Becattini et al. "Vehicle Trajectories from Unlabeled Data Through Iterative Plane Registration" http://www.micc.unifi.it/seidenari/publication/iciap-2019' pp. 11.
Villanueva et al. "DEM Generation from Fixed-Wing UAV Imaging and LiDAR-Derived Ground Control Points for Flood Estimations" Sensors 2019, 19, 3205; https://www.ncbi.nlm.nih.gov/pmc/articles/PMC6679330/ pp. 20.

* cited by examiner

| FEATURE TYPE | OPTIMIZATION SOLVER: ADAM, SGDM, RMSPROP | WINDOW SIZE: 3X3 |
|---|---|---|
| WATER | MIN | MIN |
| ROADS | MIN | MIN |
| VEG_LOW | MIN | MEAN |
| VEG_MED | MEAN | MEAN |
| VEG_HIGH | MAX | MAX |
| BUA | MAX | MEAN |
| BARE_EARTH | MIN | MEAN |

FIG. 6

GEOSPATIAL MODELING SYSTEM PROVIDING 3D GEOSPATIAL MODEL UPDATE BASED UPON ITERATIVE PREDICTIVE IMAGE REGISTRATION AND RELATED METHODS

TECHNICAL FIELD

The present disclosure relates to the field of topographical modeling, and, more particularly, to geospatial modeling systems and related methods.

BACKGROUND

Topographical models of geographical areas may be used for many applications. For example, topographical models may be used in flight simulators and for geographical planning activities. Furthermore, topographical models of man-made structures (e.g., cities) may be helpful in applications such as cellular antenna placement, urban planning, disaster preparedness and analysis, and mapping, for example.

Various types of topographical models are presently being used. One common topographical model is the digital elevation model (DEM). A DEM is a sampled matrix representation of a geographical area which may be generated in an automated fashion by a computer. In a DEM, coordinate points are made to correspond with a height or elevation value. Different types of DEMs include digital terrain models (DTMs) which represent the bare earth without any objects (e.g., vegetation and buildings), and digital surface models (DSMs) which represent the bare earth along with the objects (e.g., vegetation and buildings) thereon.

One particularly advantageous geospatial modeling system is disclosed in U.S. Pat. No. 7,983,474 to Van Workum et al., which is hereby incorporated herein in its entirety by reference. The geospatial modeling system includes at least one geospatial information database to store stereo-geographic image data and geographic feature data. A processor cooperates with the geospatial information database for generating cost coefficients defining a three-dimensional (3D) cost cube using image matching operators based upon the stereo-geographic image data, adjusting the cost coefficients of the 3D cost cube based upon the geographic feature data to generate an adjusted 3D cost cube, and generating a geospatial model based upon solving the adjusted 3D cost cube, e.g., for a best cost surface. The system and method provide an integrated approach to creating a geospatial model using available data from multiple sources.

An image change detecting system is disclosed in U.S. Pat. No. 7,528,938 to Garceau et al., which is hereby incorporated herein in its entirety by reference. This system includes an image processor cooperating with a geospatial scene model database for generating a reference geospatial image corresponding to the collected geospatial image, and a change detector cooperating with the image processor for detecting a change between the collected geospatial image and the reference geospatial image. The geospatial scene model database includes 3D scene model data, and the collected geospatial image and the reference geospatial image each include respective 2D image data. The collected geospatial image has at least one geospatial collection value associated therewith, and the image processor generates the reference geospatial image based upon synthetically positioning a virtual geospatial image sensor within a geospatial scene model based upon the at least one geospatial collection value. The at least one geospatial collection value includes at least one of a geospatial collection position, a geospatial collection orientation, and a geospatial collection field-of-view.

Despite the advantages provided by such systems, further advancements in geospatial modeling and change detection may be desirable in various applications.

SUMMARY

A geospatial modeling system may include a memory and a processor cooperating therewith to: (a) generate a three-dimensional (3D) geospatial model including geospatial voxels based upon a plurality of geospatial images; (b) select an isolated geospatial image from among the plurality of geospatial images; (c) determine a reference geospatial image from the 3D geospatial model using Artificial Intelligence (AI) and based upon the isolated geospatial image; (d) align the isolated geospatial image and the reference geospatial image to generate a predictively registered image; (e) update the 3D geospatial model based upon the predictively registered image; and (f) iteratively repeat (b)-(e) for successive isolated geospatial images.

In an example embodiment, the processor may be configured to iteratively repeat (b)-(e) until an alignment in (d) reaches a threshold. The processor may also be configured to align the isolated geospatial image and the reference geospatial image based upon cross-correlating voxels within the isolated geospatial image with voxels in the reference geospatial image. In accordance with one example, the processor may be configured to generate the 3D geospatial model based upon multi-modal collected geospatial images.

By way of example, the processor may be configured to determine the reference geospatial image based upon an image sensor synthetically positioned within the 3D geospatial model corresponding to an image collection orientation of the isolated geospatial image. The processor may be further configured to simulate an atmospheric phenomena within the reference geospatial image corresponding to an atmospheric phenomena at a time of image capture of the isolated geospatial image, and to perform the alignment further based upon the simulated atmospheric phenomena.

In an example embodiment, the processor may be further configured to obtain a newly collected geospatial image, determine a reference geospatial image from the 3D geospatial model using AI and based upon the newly collected geospatial image, align the newly collected geospatial image and the reference geospatial image to generate a new predictively registered image, and update the 3D geospatial model based upon the new predictively registered image. Also by way of example, the processor may be configured to generate the 3D geospatial model based upon triangulation grouping of voxels between the plurality of geospatial images.

A related geospatial modeling method may include using a processor and associated memory for: (a) generating a three-dimensional (3D) geospatial model including geospatial voxels based upon a plurality of geospatial images and storing the 3D geospatial model in a memory; (b) selecting an isolated geospatial image from among the plurality of geospatial images; (c) determining a reference geospatial image from the 3D geospatial model using AI and based upon the isolated geospatial image; (d) aligning the isolated geospatial image and the reference geospatial image to generate a predictively registered image; (e) updating the 3D geospatial model based upon the predictively registered image; and (f) iteratively repeating (b)-(e) for successive isolated geospatial images.

A related non-transitory computer-readable medium may have computer executable instructions for causing a processor to perform steps including: (a) generating a three-dimensional (3D) geospatial model including geospatial voxels based upon a plurality of geospatial images; (b) selecting an isolated geospatial image from among the plurality of geospatial images; (c) determining a reference geospatial image from the 3D geospatial model using Artificial Intelligence (AI) and based upon the isolated geospatial image; (d) aligning the isolated geospatial image and the reference geospatial image to generate a predictively registered image; (e) updating the 3D geospatial model based upon the predictively registered image; and (f) iteratively repeating (b)-(e) for successive isolated geospatial images.

BRIEF DESCRIPTION OF THE DRAWINGS

FIG. 6 is an example reward matrix which may be used by the system of FIG. 3.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
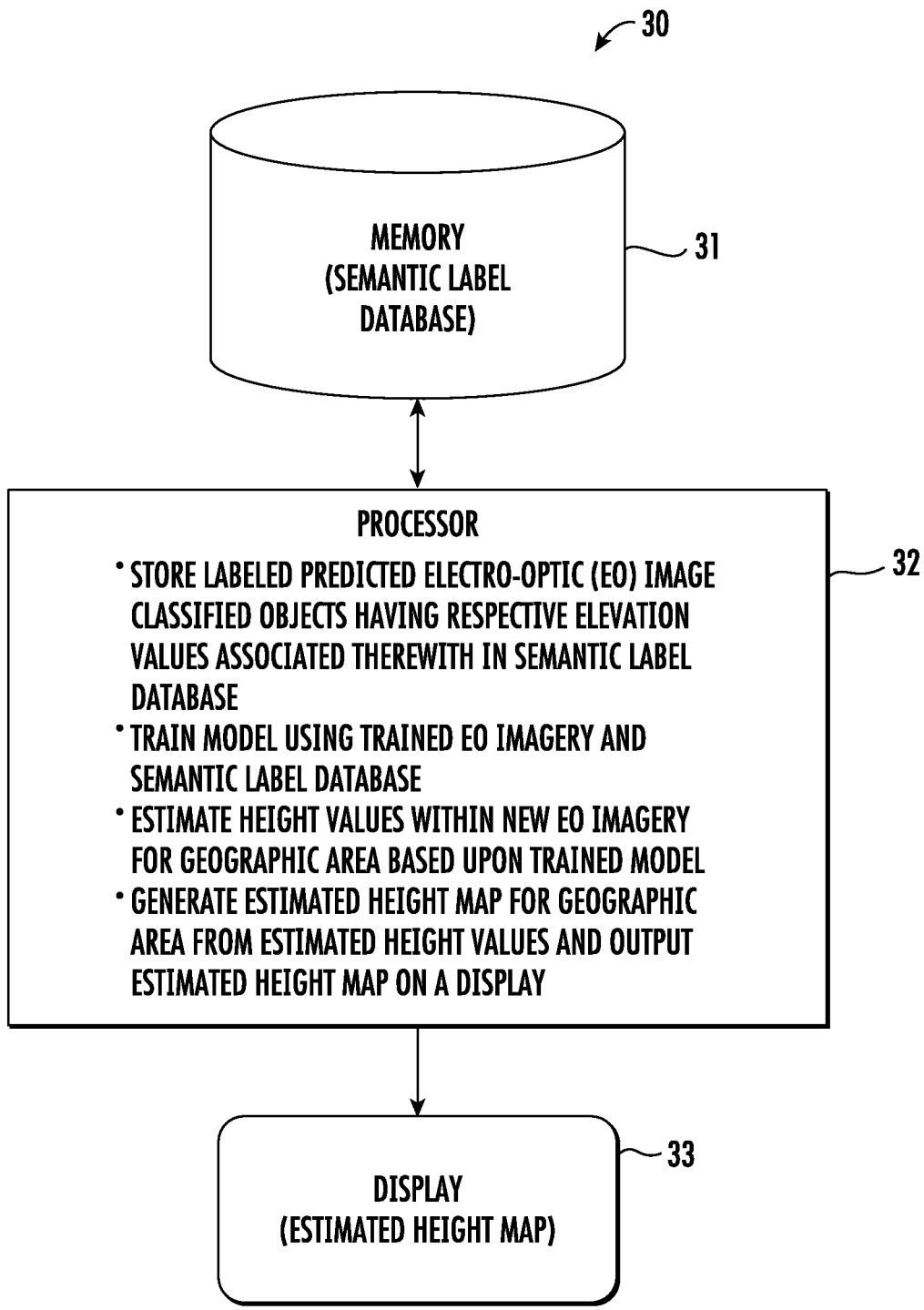
FIG. 1 is a schematic block diagram of an artificial intelligence (AI) system for generating estimated height maps from electro-optic imagery in accordance with an example embodiment.
Figure 2:
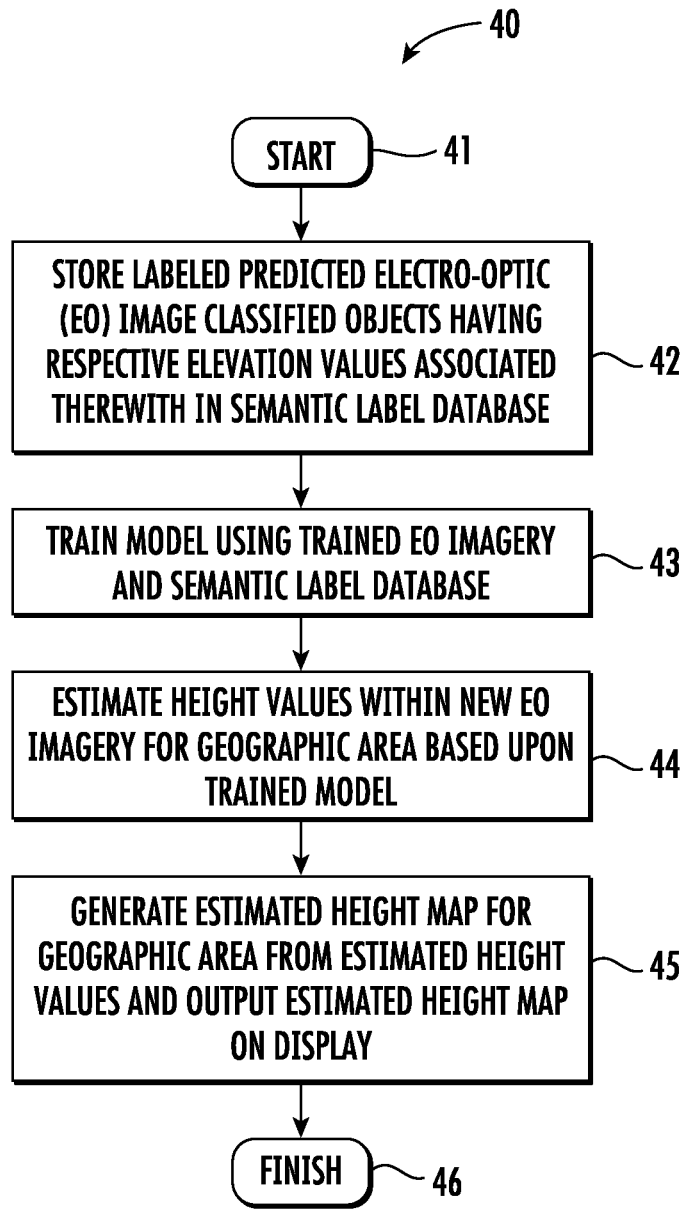
FIG. 2 is a flow diagram illustrating method aspects associated with the system of FIG. 1.

Referring initially to FIG. 1 and the flow diagram 40 of FIG. 2, an artificial intelligence (AI) system 30 for geospatial height estimation and associated method aspects are first described. Generally speaking, the system 30 advantageously allows for the determination of elevation from a single multispectral image. The system 30 may improve the estimation of pixel height from various types of images to provide better 2D/3D maps, using images with and without sensor information. Deep learning on geospatial data is performed with a convolutional neural network (CNN) trained end-to-end. The system 30 uses image semantic segmentation to classify land-use land-cover (LULC) features. Moreover, the use of game theoretic decision analysis optimization with an ensemble of models and segmentation information helps determine whether pixel heights are high, medium, or low.

By way of background, with respect to digital elevation models (DEMs), some systems utilize parallax-based height extraction from multiple electro-optic (EO) (a.k.a. Red-Green-Blue or RGB) images to determine heights values for a geometric area or scene. However, this may be relatively complicated in terms of image registry and processing, as well as requiring increased image captures. The system 30 may not only allow for determination of height values from a single RGB image, but also advantageously improves the estimation of pixel height from various types of images to provide better 2D/3D maps.

Remote sensing typically requires that image analysts be able to identify regions in imagery that correspond to an object or material. Automatic extraction of image areas that represent a feature of interest involves two steps: accurate classification of pixels that represent the region, while minimizing misclassified pixels, and vectorization, which extracts a contiguous boundary along each classified region. This boundary, when paired with its geo-location, can be inserted into a feature database independent of the image.

The sheer volume of available high-resolution satellite imagery and the increasing rate at which it is acquired present both opportunities and challenges for the simulation and visualization industry. Frequently updating material classification product databases, using high-resolution panchromatic and multispectral imagery, may only be feasible if time and labor costs for extracting features, such as pixel labeling, and producing products from the imagery are significantly reduced. The approach set forth herein provides flexible and extensible automated workflows for LULC pixel labeling and material classification. The products of workflows may undergo an accelerated review and quality control process for feature extraction accuracy by geospatial analysts.

A network can also be trained to predict semantic segmentation maps from depth images. A large body of research in supervised learning deals with analysis of multi-labeled data, where training examples are associated with semantic labels. The concept of learning from multi-label data has attracted significant attention from many researchers, motivated by an increasing number of new applications, such as semantic annotation of images and video.

In remote sensing, Digital Terrain Model (DTM) generation is a long-standing problem, involving bare-terrain extraction and surface reconstruction to estimate a DTM from a Digital Surface Model (DSM). Most existing methods have difficulty handling large-scale satellite data of inhomogeneous quality and resolution and often need an expert-driven, manual parameter-tuning process for each geographical type. Feature descriptors based on multiscale morphological analysis can be computed to extract reliable bare-terrain elevations from DSMs.

Image-to-height estimation from a single monocular image, using deep learning networks, is a relatively recent research topic. Estimating height in a scene benefits remote sensing tasks, such as feature labeling and change detection, especially when LIDAR data is not available.

The system 30 illustratively includes a memory 31 and a processor 32 cooperating therewith. Beginning at Block 41, the processor 32 may cooperate with the memory 31 to store a plurality of labeled predicted EO image classified objects having respective elevation values associated therewith in a semantic label database, at Block 42, and train a model using trained EO imagery and the semantic label database (Block 43). The processor 32 may further estimate height values within new EO imagery for a geographic area based upon the trained model, at Block 44, and generate an estimated height map for the geographic area from the estimated height values and output the estimated height map on a display 33, at Block 45. The method of FIG. 2 illustratively concludes at Block 46.

As will be discussed further below, the system 30 may advantageously use a fully convolutional-deconvolutional neural network trained end-to-end with semantic segmentation to classify land use/land cover features. Moreover, the system 30 may also utilize a plurality of ensemble models by game theory optimization (GTO) per pixel to advantageously improve the estimation of pixel height from various types of images to provide better 2D/3D maps. This allows not only for the support of multi-spectral and panchromatic images, but also the use of images with and without sensor information.

An example implementation of the AI system 30 is now described with reference to FIGS. 3-6. The example system 30 advantageously provides for an enhancement to basic image-to-height estimation approaches. More particularly, the present approach adds image semantic segmentation and classification information and game theory optimization from an ensemble of models. The result may then be used as a seed for traditional image parallax height estimation algorithms, thus improving their accuracy.

Deep convolutional neural networks have recently performed extremely well on different tasks in the domain of computer vision, such as object detection, image classification, image segmentation, and object tracking. The structure of modern deep CNNs has evolved significantly. The renaissance of neural networks has ushered in a new era in which very deep networks have been proposed to carry out various tasks in computer vision. Approximate height may be determined from a single image, based on object recognition and spatial context.

Depth estimation in monocular imagery, which may play a crucial role in understanding 3D scene geometry, is an ill-posed problem. Recent methods have brought about significant improvements by exploring image-level information and hierarchical features from deep CNNs. These methods model depth estimation as a regression problem and train regression networks by minimizing mean squared error, which may suffer from slow convergence and unsatisfactory local solutions. Existing depth estimation networks may employ repeated spatial pooling operations, resulting in undesirable low-resolution feature maps. To obtain high-resolution depth maps, skip-connections or multilayer deconvolution networks may be needed, which complicates network training and requires more computations. A multi-scale network structure may be used to avoid unnecessary spatial pooling and capture multi-scale information. Successful training of deep CNNs often requires many thousands of annotated training samples. Network training strategies may rely on the strong use of data augmentation to optimize the efficient use of available annotated samples.

The processor 32 illustratively operates a training module 50 which incorporates the semantic label database 55 (which may be stored in the memory 31), from which land use/land cover label data 51 is provided. In the present example, an EO stochastic gradient descent model (SGDM) 53 is trained based upon the land use/land cover label data 51, as well as trained EO imagery samples 52 for which known height truth data is available.

The trained EO SGDM model 53 receives new EO imagery 54 and generates predicted land use/land cover mask data, which is provided as an input to a game theory optimization (GTO) module 56. The other inputs to the GTO module 56 are provided as elevation data by different models 57-59. In the illustrated example, models utilize different gradient descent optimization algorithms. More particularly, the first model 57 uses a UNet Adaptive Moment Estimation (Adam) algorithm, the second model 58 uses an SGDM algorithm, and the third model 39 uses an RMSProp algorithm. The models 57-59 receive as inputs the new EO imagery 54, as well as height reference data 60, which may be provided by sources such as LIDAR, the Digital Point Positioning Database (DPPDB), etc.

The GTO module 56 further receives labeled predicted EO image classified object data 61, which may also be stored in the memory 31. The output of the GTO module 56 is provided an accuracy assessment module 62, along with the height reference data 60. The accuracy assessment module may thereby compare the predicted height versus the height reference data 60, from which the estimated EO image height map 63 may accordingly be generated.

By way of background, learning to predict scene depth from RGB inputs is challenging. Learning for scene depth is provided by monocular videos. Work in unsupervised image-to-depth learning has established strong baselines in this domain. High-quality results can be achieved by using geometric structure in the learning process for modeling, which has been shown to transfer across data domains, e.g., from outdoor to indoor scenes. The approach is of practical relevance, as it allows for transfer across environments by transferring models trained on data collected, for example, for robot navigation in urban scenes to indoor navigation settings.

Deep-learning-based approaches may be effective for the detection and reconstruction of buildings from single aerial images. An optimized, multi-scale, convolutional-deconvolutional network derives the information needed to reconstruct the 3D shapes of buildings, including height data and linear elements of individual roofs, directly from the RGB image. Networks may be composed of two feature-extraction levels to predict the coarse features and then automatically refine them. The predicted features include the normalized digital surface models.

Estimating the depth of each pixel in a scene can be done using a single monocular image. Unlike traditional approaches that attempt to map directly from appearance features to depth, semantic segmentation of the scene, using semantic labels, can guide the 3D reconstruction. Knowing the semantic class of a pixel or region allows for enforcement of constraints on depth and geometry. In addition, depth can be more readily predicted by measuring the difference in appearance with respect to a given semantic class. The incorporation of semantic features enables better results to be achieved, with simpler models.

To automatically extract height information from a multispectral image, the present approach first trains a CNN UNet to perform semantic segmentation of a multispectral image with four channels: three color and one near-infrared. This produces pixel-based height maps. The first part of the UNet performs convolutional feature extraction, while the second part of the UNet performs deconvolutional height estimation.

Figure 4:
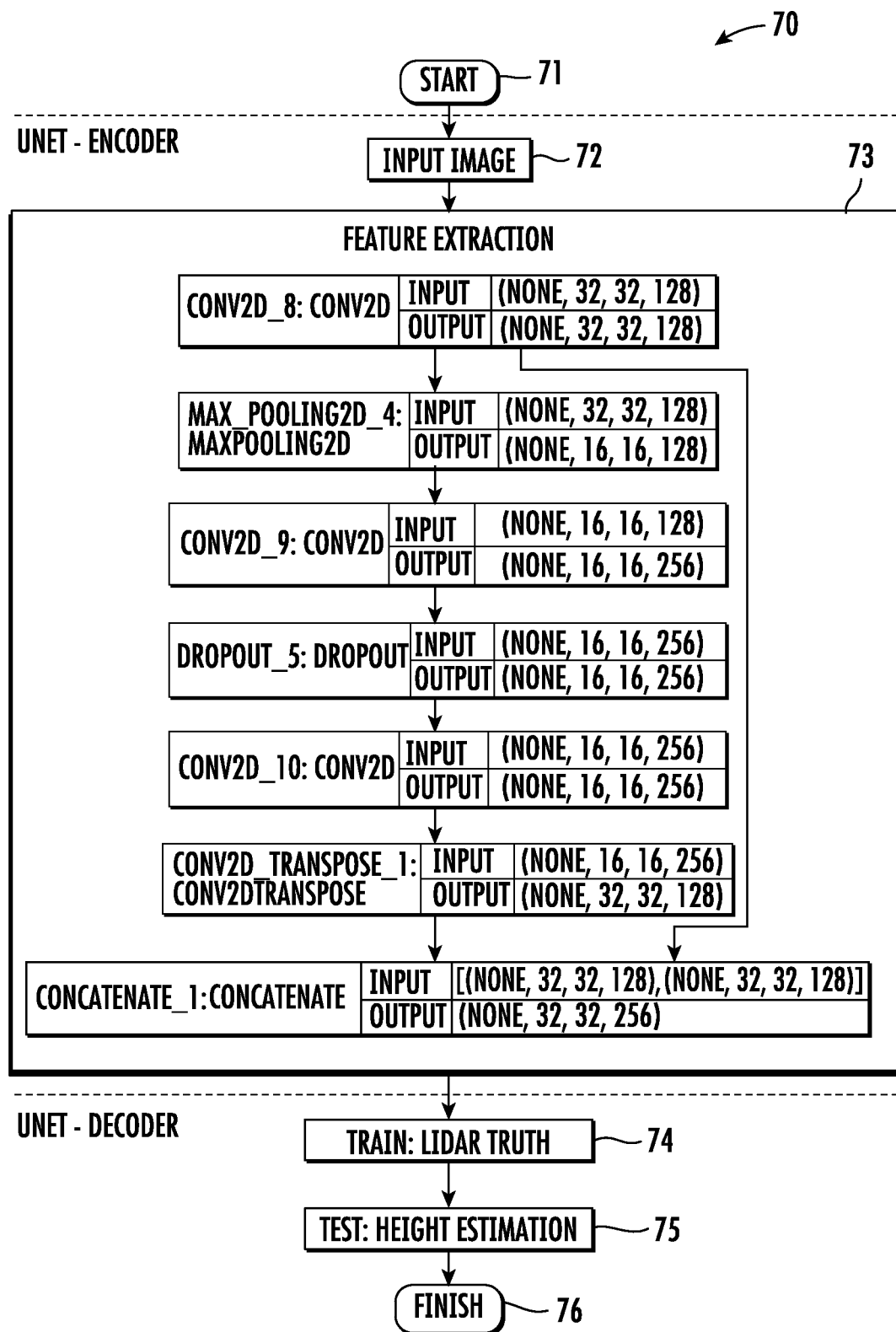
FIG. 4 is a flow diagram illustrating a convolutional neural network processing flow which may be implemented by the system of FIG. 3 in an example embodiment.

More particularly, the processor 32 may implement the training and GTO modules 50, 56 using the above described CNN UNet configuration, which is illustrated in the flow diagram 70 of FIG. 4. Beginning at Block 71, UNet encoder operations begin with input of the EO imagery 54 (Block 72), from which feature extraction is performed (Block 73) using the sample CNN feature extraction routine shown (although other suitable configurations may be used in different embodiments). UNet decoder operations may then follow by training based upon the trained EO imagery truth data 52 (e.g., LIDAR data, etc.), at Block 74, and testing using the height reference data 60 (Block 75). This allows previously unseen input image data to be used for generating height estimations. The method of FIG. 4 illustratively concludes at Block 76.

In an example implementation, a four skip (pooling) connection configuration may be used to provide relatively fast convergence in the convolutional network, although other numbers may be used in different embodiments. More particularly, the CNN UNet height prediction incorporates layers of convolution and pooling layers for extracting multi-channel features. Feature weights may be trained, and height may advantageously be estimated given a single RGB image.

How well each model works depends on feature properties, quality and quantity of training data, and parameter settings for individual algorithms. Validation of results may be used to properly select the optimal model and model parameters for a given problem. If training data is drawn from a non-linear distribution, it is unlikely that a linear learning method would be a good fit for the data, resulting in a high bias, although this data can be generalized to some extent. If training data is linearly separable, and we use a highly non-linear-based learning algorithm, then it will likely over fit the data, suffer from high variance, and not be able to generalize well with the resulting output. If only minimal training data is available or the data is not adequately representative of the feature space, then accuracy and precision will be negatively affected. It has been found that the CNN UNet trains to a decreasing RMSE of estimated heights, as compared against LIDAR truth.

Figure 5:
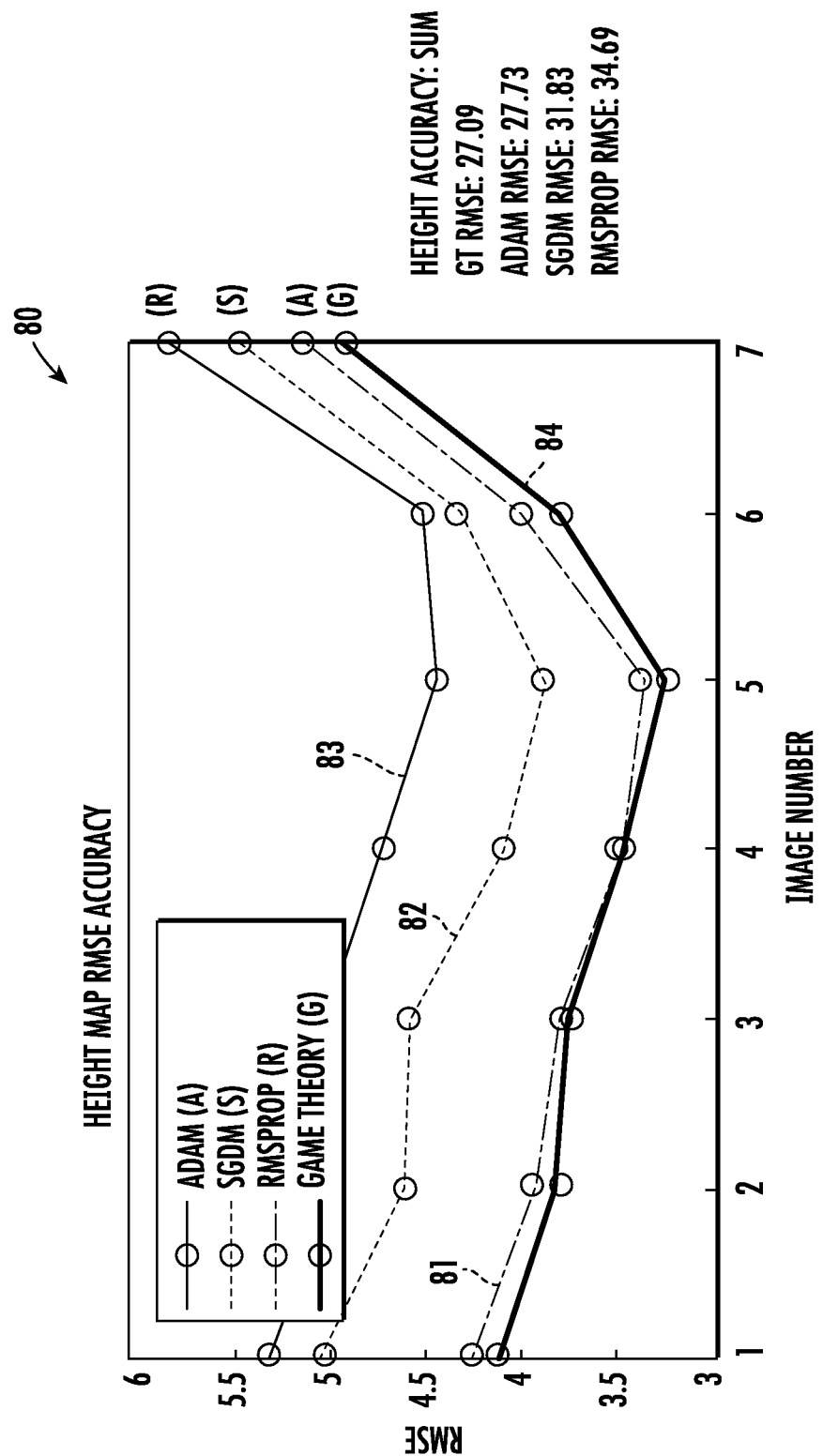
FIG. 5 is a graph illustrating height map root mean square error (RMSE) accuracy for an example implementation using the system of FIG. 3.

The above-described game theory optimization provides performance per pixel that advantageously exceeds that of an of the individual Adam, SGDM, or RMSProp models, as will be understood with reference to the graph 80 of FIG. 5. More particularly, the graph 80 shows the height map root mean square error (RMSE) in an example implementation for the Adam model 57 (plot line 81), SGDM model 58 (plot line 82), RMSProp model 59 (plot line 83), and the GTO module 56 (plot line 84), which is the lowest of the four. The corresponding height accuracy RMSE summations in this example are 34.69 for RMSProp, 31.83 for SGDM, 27.73 for Adam, and 27.09 for GTO.

Optimal decision analysis helps close the gap in terms of the difference between automated feature extraction and feature extraction performed by analysts. To make informed decisions, an expert will reason with multi-dimensional, heterogeneous data and analyze the results. Items in such datasets are typically represented by features. However, as argued in cognitive science, features do not provide an optimal space for human reasoning. In fact, humans tend to organize complex information in terms of prototypes or known cases rather than absolutes. When confronted with unknown data items, humans assess them in terms of similarity to these prototypical elements. Interestingly, an analogous, similarity-to-prototype approach, where prototypes are taken from data, has been successfully applied in machine learning. Combining such a machine learning approach with human prototypical reasoning in a Visual Analytics context may require integration of similarity-based classification with interactive visualizations. To that end, data prototypes may be visually represented such that they trigger direct associations to cases familiar to domain experts. Highly interactive visualizations are used to explore data and classification results. This approach not only supports human reasoning processes but is also suitable for enhancing an understanding of heterogeneous data.

A pixel is determined to belong to a classification set when the distance, in feature space, between the pixel's spectral signature and the signature of a representative set of pixels is small. Classification algorithms vary in how the feature vector (and, therefore, feature space) is defined, how the distance metric is defined, how a representative set of pixels or distribution is determined, and in which algorithm to use to identify pixels matches. Nevertheless, they all share the concept of goodness-of-fit, i.e., how well a pixel fits the target spectral distribution, as measured by a per-pixel score. The goal is to accurately identify the boundary of a spatially consistent set of pixels that belong to a region of interest, with the intent being to extract that region as a distinct feature.

Semantic segmentation uses a label for each pixel. The system 30 may use deep learning to determine a precise measurement of land-use/land-cover from high-resolution aerial imagery to differentiate classes with similar visual characteristics. To assign a classification of features over an image, supervised learning may be applied to the imagery. Supervised learning creates a classifier model that can infer the classification of a test sample using knowledge acquired from labeled training examples. A CNN network trained with 94% accuracy was achieved with one example test dataset using the above-described approach.

More particularly, a random patch extraction datastore was used in Matlab to feed the training data to the network. The datastore extracts multiple corresponding random patches from an image and pixel label datastores. Each minibatch contains 16 patches that are 256×256 pixels in size. 25 epochs were used, with 1000 minibatches per epoch. A UNet structure from Matlab was also used in the example implementation, such that the network can be drawn with a symmetric shape like the letter U. As noted above, the network was trained using stochastic gradient descent method (SGDM) optimization. Image feature testing achieved an accuracy of 92% with this test configuration.

If we can estimate the scene structure, we can better predict the scene heights by knowing the relationships between the features. Estimating height from image features puts a significant burden on the learning algorithm. Using semantic features from the image may unburden the image-to-height learning algorithm. Many image analysis and computer vision problems can be formulated as a scene-labeling problem, in which each site is to be assigned a label from a discrete or continuous label set, with contextual information. An n-person cooperative game yields an efficient deterministic optimization algorithm that exhibits very fast convergence. We use a linear program to optimally guide the height prediction with feature classes from imagery.

The above-described game-theoretic perspective to solving the problem of supervised classification takes the best pixel height prediction derived from an ensemble of CNN supervised classifications. This is a game in the sense that pixel data points are "players" that participate in the game to decide their heights by choosing the best network model. The land cover classification labels assist with decision analytics. Within this formulation, a weighted reward matrix is used for consistent labeling of height values with classification factors, resulting in higher accuracy and precision.

Further optimization may be achieved by performing supervised landmark-based image segmentation that employs game-theoretic concepts. This is done by creating a reward matrix with land cover classifications and different model solvers, as shown in the table 85 of FIG. 6. The reward matrix illustratively includes land cover classifications and different model solvers as shown. The reward matrix is constructed from a M*C*N volume, where M is number of models in the ensemble. In simulation results, one model was used for each solver for a total of 3 models: Adam; SGDM; and RMSProp, as discussed above. C is the number of classes. In the simulation, seven classes were used, namely: water; roads; vegetation low; vegetation medium; vegetation high; built up areas (BUAs); and bare earth. However, it will be appreciated that other numbers and types of classes may be used. N is the number of surrounding pixels in a neighborhood around the subject pixel height to predict. In the example simulation, a 3×3 or 9 neighbors window was used, but here again different windows sizes may be used in different embodiments.

The GTO module 56 may solve the reward matrix using a linear program. The linear programming is useful for solving game theory problems and finding optimal strategies. By way of example, an interior-point algorithm, the primal-dual method, may be used which is feasible for convergence. The best machine learning model to believe is chosen on a per-pixel basis. The primal standard form, which is used to calculate optimal tasks and characteristics, is set forth in the following equation:

maximize or minimize$(f^*x)$ s.t.

$A^*x=b$ $x \geq 0$

There is a need for detailed surface representations so that a feasible platform can be provided for detailed simulation of urban modeling. First, a DSM is generated based on aerial image stereo pairs, using a matching method. Features and 3D models extracted from this data may provide benefits in various GIS applications, for which the building is necessary. For example, 3D surface objects extracted from aerial photographs can represent a significant layer of GIS databases for the simulation of natural disasters, telecommunications planning (i.e., positioning of antennas), 3D land-use zoning, and allowed building volumes, usage, and density. They are the main tools that help define the image of a city and bring into focus, for instance, the model of best practice for rehabilitation and conservation.

The AI system 30 advantageously provides for the addition of semantic segmentation, as well as game theory optimization from selecting the best pixel approximations from ensemble of different models. The results of the GTO module 56 may also advantageously be used as initial conditions for seeding into other topographical models, as will be discussed further below. Furthermore, each land use/land cover feature may be used for optimal decision making of which model in the ensemble should be chosen per voxel. Indeed, semantic segmentation may be utilized to refine classifications though the use of second phase CNN's to improve classification accuracy, e.g., the season of the year for a forest, etc.

The output of the system 30 may be used for numerous commercial and civil applications, such as: 3D Data (and 3D change) for energy exploration, mining/site assessment and remediation, power/utilities facilities and corridors, infrastructure/urban planning, disaster response/mitigation, wireless modeling, etc. Other example applications may include volumetric processing, such as for EO and SAR applications. The system and techniques set forth herein may also be used for providing enhanced geospatial models (e.g., DSMs) for next generation mapping applications (e.g., Google Earth, NGA Virtual Earth, etc.). Further details regarding the above-described enhancements to image-to-height estimation may be found in co-pending U.S. application Ser. No. 17/030,600 filed Sep. 24, 2020, which is hereby incorporated herein in its entirety by reference.

Figure 7:
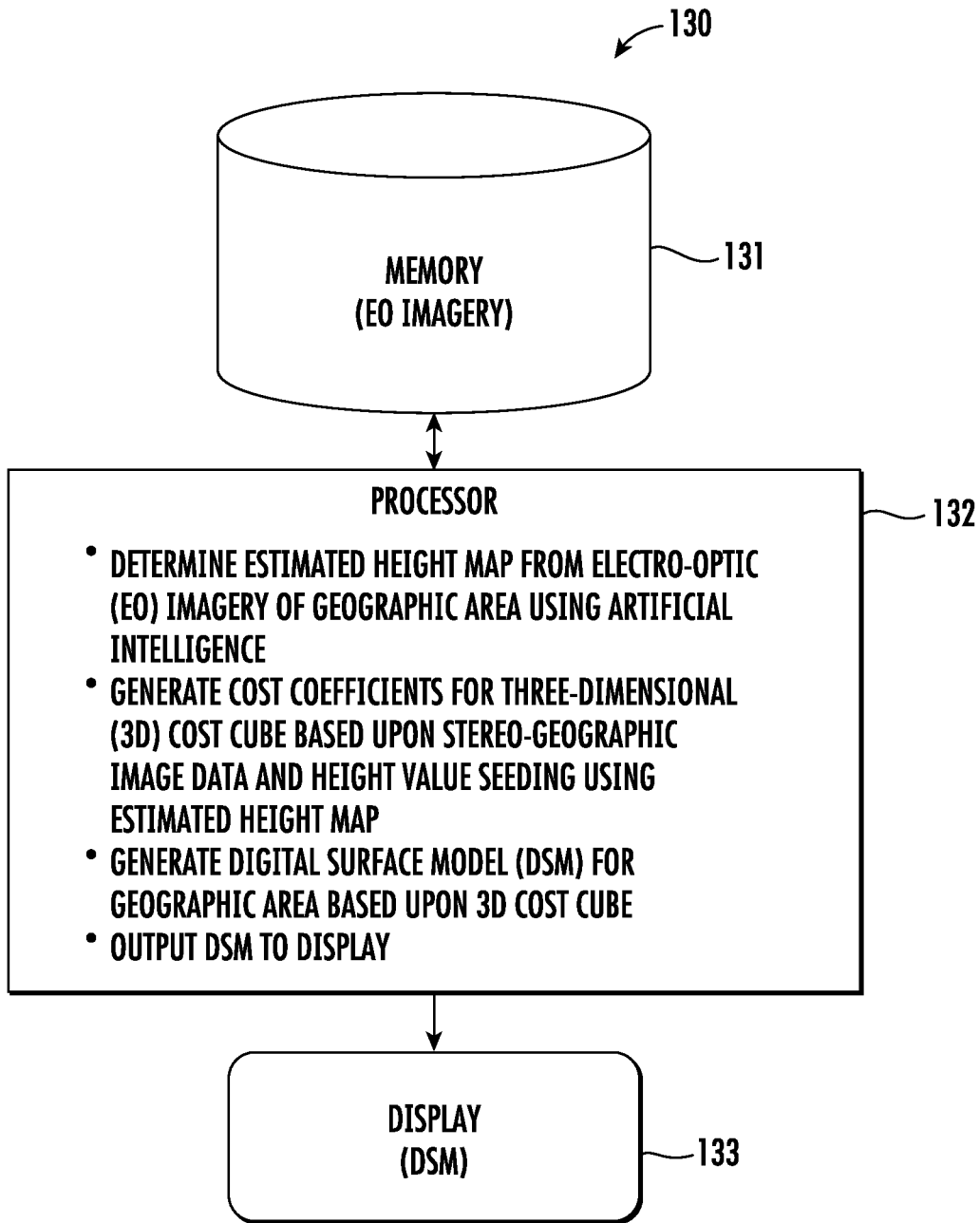
FIG. 7 is a schematic block diagram of an AI system for generating digital surface models (DSMs) based upon stereo-geographic image data and height value seeding using an estimated height map.
Figure 8:
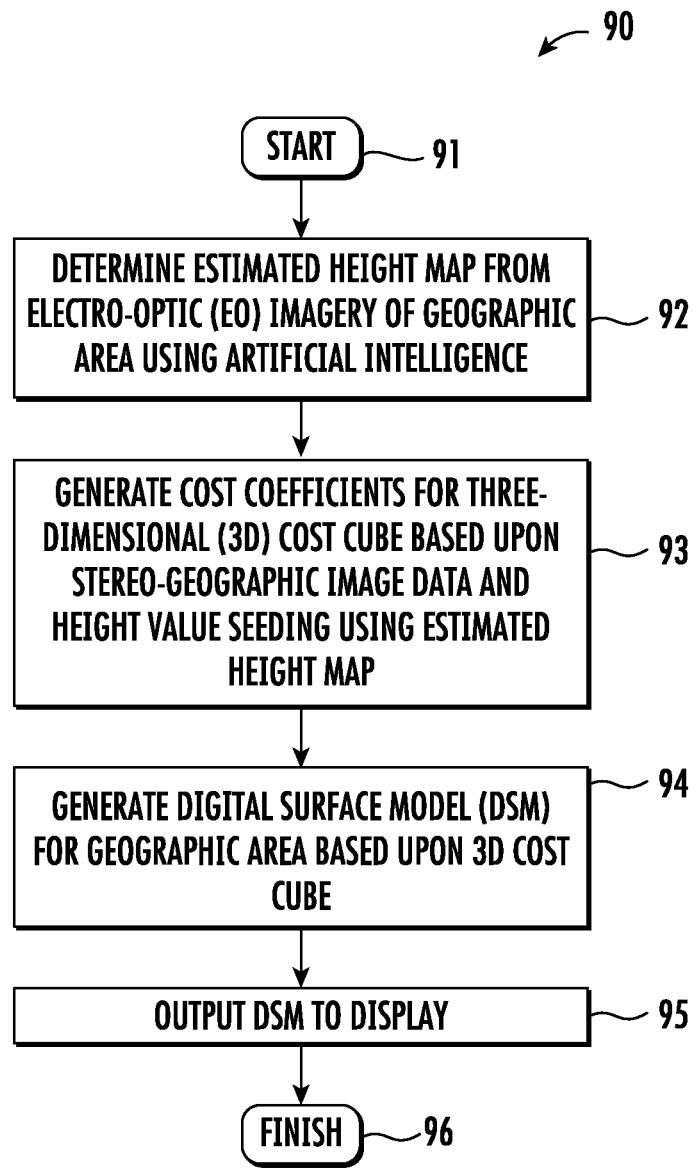
FIGS. 8-10 are flow diagrams illustrating example method aspects associated with the system of FIG. 7.

Turning now to FIG. 7 and the flow diagram 90 of FIG. 8, another implementation of an AI system 130 for generating DSMs based upon a 3D cost cube and associated methods are now described. By way of background, it is a time-consuming process to generate cost coefficients defining a 3D cost cube using image matching operators based upon stereo-geographic image data. To save time and computation, the system 130 may advantageously initialize the adjusting of the cost coefficients of the 3D cost cube based upon geographic feature data to generate an adjusted 3D cost cube for a best cost surface. More particularly, this may be done based upon the estimated height data provided by the system 30 described above. This approach advantageously improves accuracy for creating a geospatial model using available data from multiple sources.

Beginning at Block 91, the system 130 illustratively includes a memory 131 and a processor 132 cooperating therewith to determine an estimated height map from EO imagery of a geographic area using artificial intelligence, at Block 92. The processor 132 further generates cost coefficients for a 3D cost cube based upon stereo-geographic image data and height value seeding using the estimated height map, at Block 93, generates a DSM for the geographic area based upon the 3D cost cube (Block 94), and outputs the DSM to a display 133, at Block 95. The method of FIG. 8 illustratively concludes at Block 95.

The above-described game-theoretic height prediction may advantageously be used as an initialization seed value to enhance DSM height extraction, using a cost cube algorithm. Processing time is milliseconds for initial height map estimation from aerial imagery, using a trained model. More particularly, the use of this initial height map speeds up processing time and improves DSM accuracy. Predicted LULC features may also be used to determine the search range. Here, the area to search is refined along each sensor ray. This not only allows for faster processing but also for a better starting point for improved height extraction accuracy.

Figure 9:
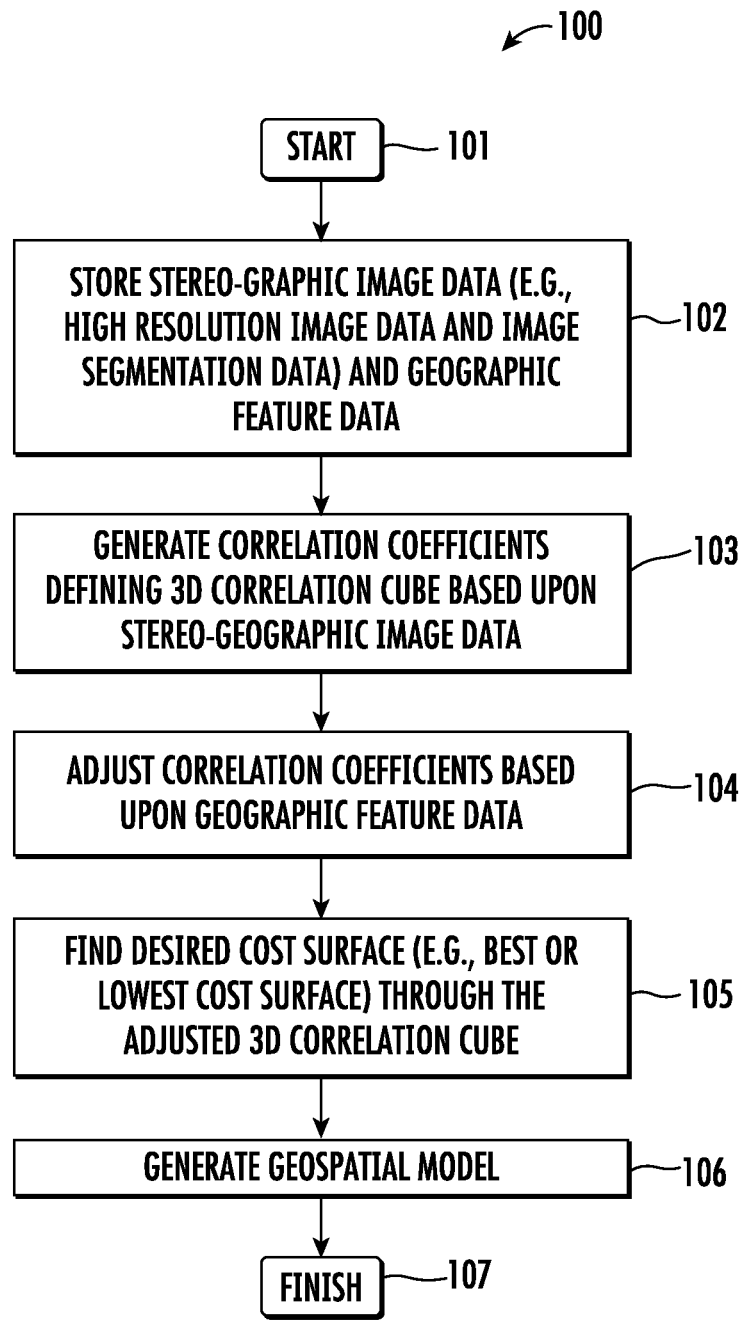

The process will now be further described with reference to the flow diagram 100 of FIG. 9. The method begins (Block 101) with storing stereo-geographic image data and geographic feature data, at Block 102. Processing the stored stereo-geographic image data and geographic feature data includes generating cost coefficients defining a 3D cost cube based upon the stereo-geographic image data (Block 103), adjusting the cost coefficients of the 3D correlation cube based upon the geographic feature data to generate an adjusted 3D cost cube (Block 104), and generating a geospatial model based upon the adjusted 3D correlation cube (Block 106) before ending at Block 107. Processing the stored stereo-geographic image data and geographic feature data may also include, at Block 105, finding a desired cost surface through the adjusted 3D cost cube to generate the geospatial model.

Figure 10:
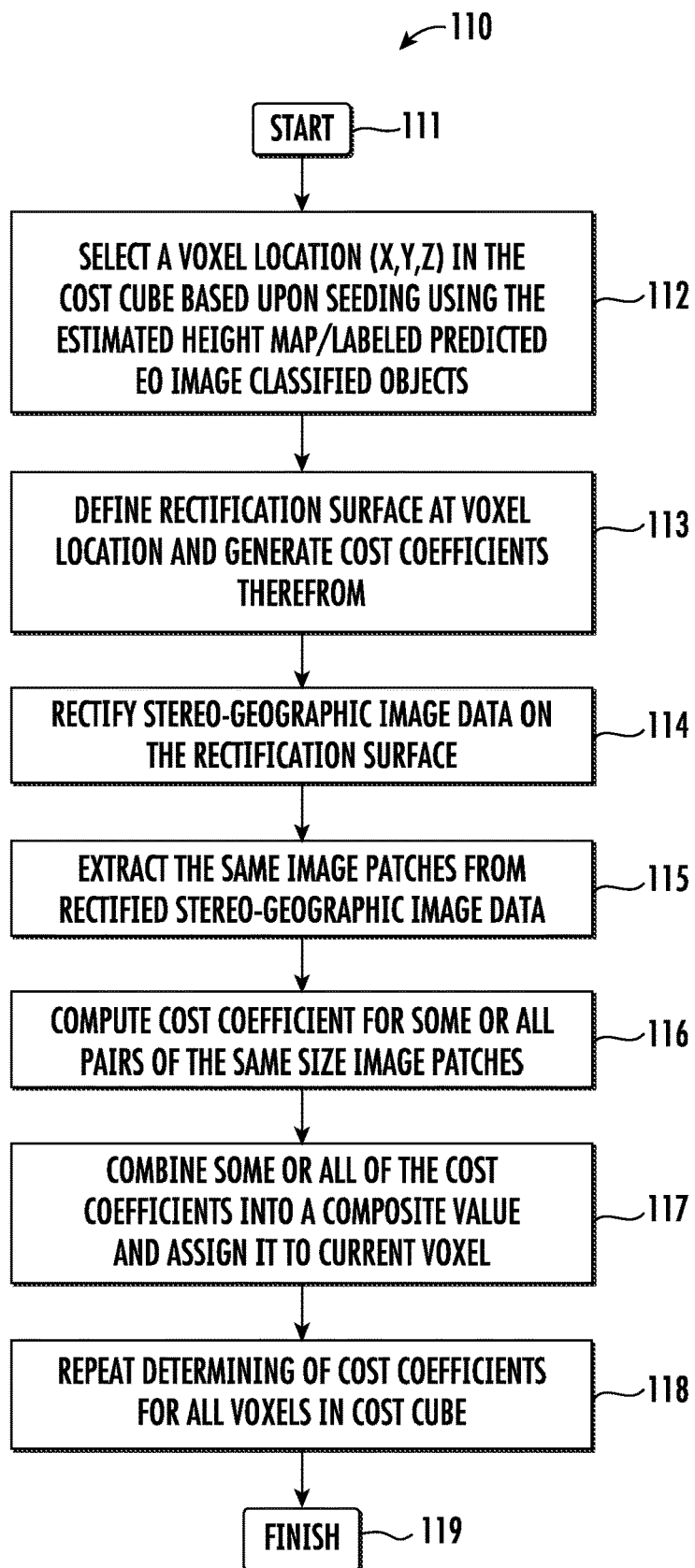

Referring more specifically to the flowchart 110 of FIG. 10, processing of the stored stereo-geographic image data and geographic feature data to generate the cost coefficients defining the 3D cost cube may begin at Block 111. The process illustratively includes selecting a voxel location (X,Y,Z) in the cost cube and defining a rectification surface at that point, at Blocks 112-113, and rectifying the stereo-geographic image data on the rectification surface, at Block 114. More particularly, the estimated EO image height map and labeled predicted EO image classification objects may be used to seed the selection of the voxel location in the cost cube by refining the area to search along each sensor ray. This allows not only for faster processing, but also for a better starting point for improved height extraction and enhanced accuracy. The land use land cover predicted features are used to further determine the appropriate search range.

Additionally, same size image patches are extracted from the rectified stereo-geographic image data, at Block 115, and a cost coefficient is computed for some or all pairs of the same size image patches, at Block 116. The cost coefficients may be based on any image matching operator such as correlation, image gradients, maximum entropy, pixel differences, etc., or any combination of such operators. The cost coefficients for all pairs of same size image patches may be combined into a single value that may be assigned to the voxel location, at Block 117. The process may be repeated for each voxel in the cost cube, at Block 118, and the process illustratively concludes at Block 119. Further details regarding the generation of DSMs from 3D correlation cubes are set forth in the above-noted U.S. Pat. No. 7,983,474 to Van Workum et al., and in co-pending U.S. application Ser. No. 17/030,553 filed Sep. 24, 2020, which is hereby also incorporated herein in its entirety by reference.

Figure 11:
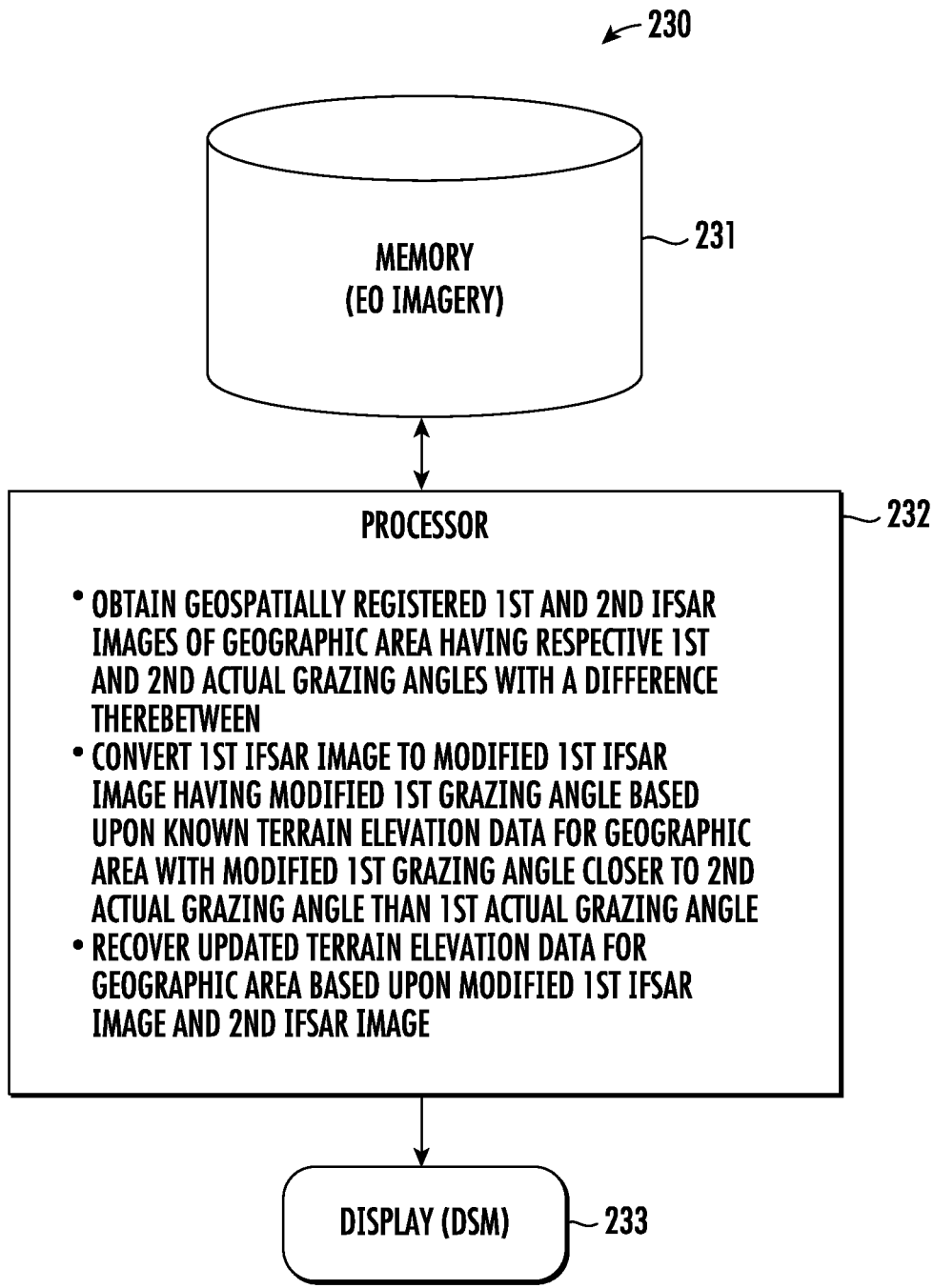
FIG. 11 is a schematic block diagram of a system for recovering updated terrain elevation data for geographic area from interferometric standing aperture radar (IFSAR) images.
Figure 12:
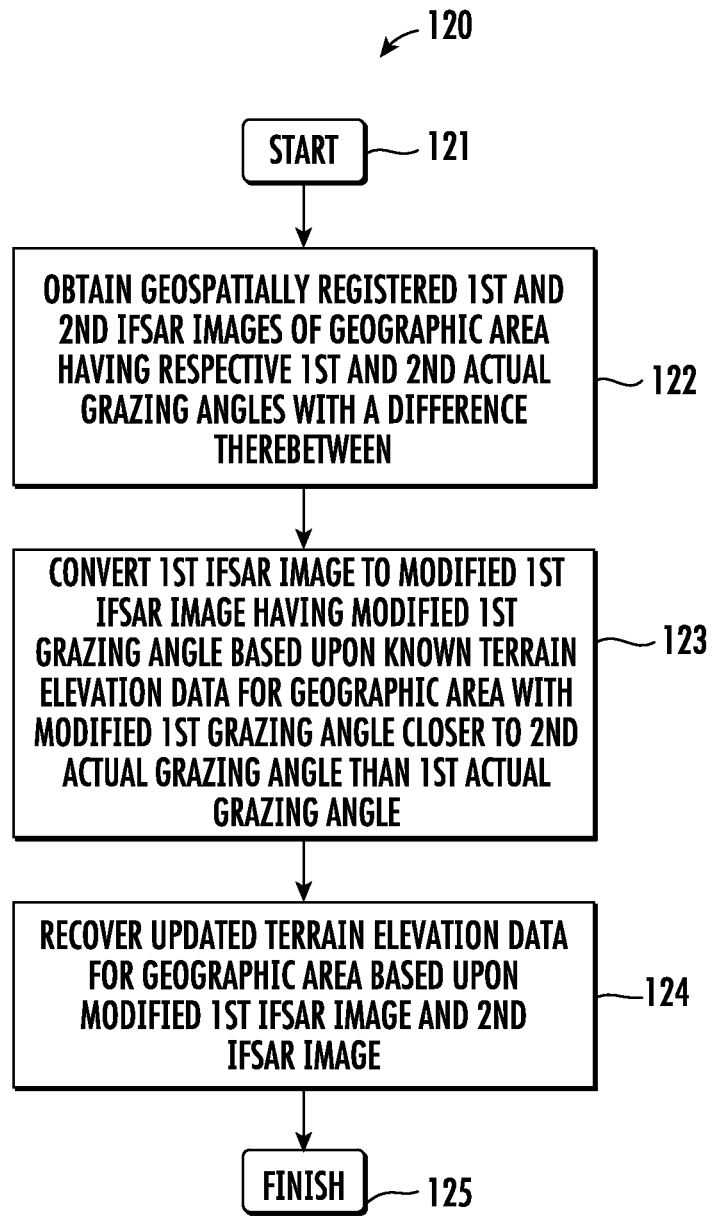
FIG. 12 is a flow diagram illustrating example method aspects associated with the system of FIG. 11.
Figure 13A:
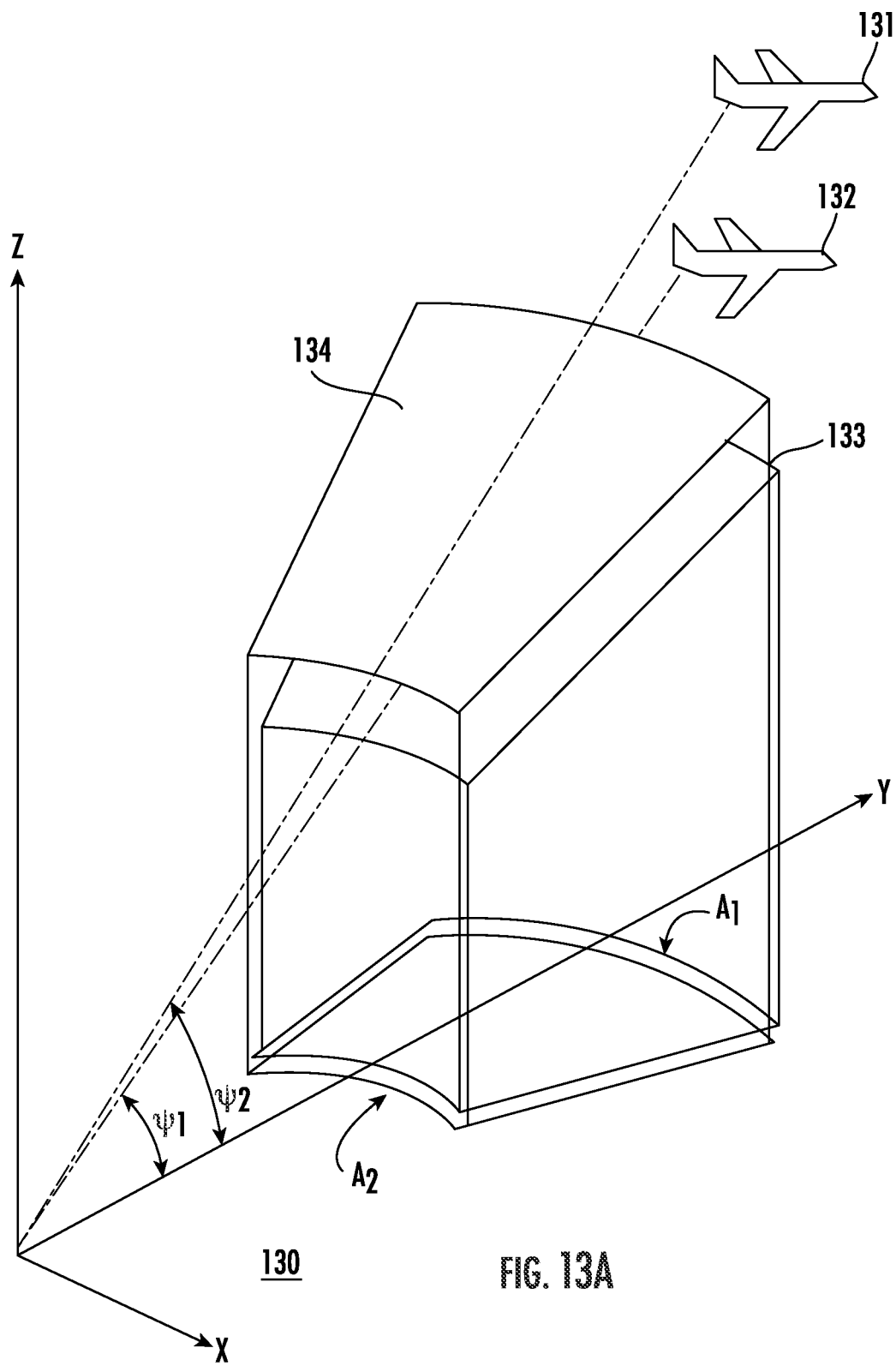
FIGS. 13A and 13B are perspective views of IFSAR data collections and differences between the grazing angles thereof before and after a grazing angle conversion by the system of FIG. 11.

Turning now to FIG. 11 and the flow diagram 120 of FIG. 12, the above-described estimated height map may also be used as a basis for recovering updated terrain elevation data from IFSAR images. By way of background, and referring additionally to FIG. 13A, baseline decorrelation requires that the aperture areas for an interferometric pair of SAR (IFSAR) images strongly overlap when projected in a common processing plane, such as the ground plane 130. In the illustrated example, there are two IFSAR collection platforms, namely a first airplane 131 collecting first IFSAR imagery 133 from a first grazing angle $\psi_1$, and a second airplane 132 collecting second IFSAR imagery 134 from a second grazing angle $\psi_2$. Both images should have approximately the same mid-aperture boresight. Avoiding target height aliasing requires that the difference in grazing angles is constrained by the largest pixel to pixel height change in the image, otherwise the 2D phase unwrapping can fail, as follows:

$$h_a = \frac{\lambda}{4} \frac{\cos\psi}{\Delta\psi},$$

which represents the maximum height change from pixel to pixel without aliasing. These constraints make it difficult if not impossible to get unambiguous terrain elevation data from a pair of SAR images if the grazing angles differ too much for the height changes present in the scene.

Figure 13B:
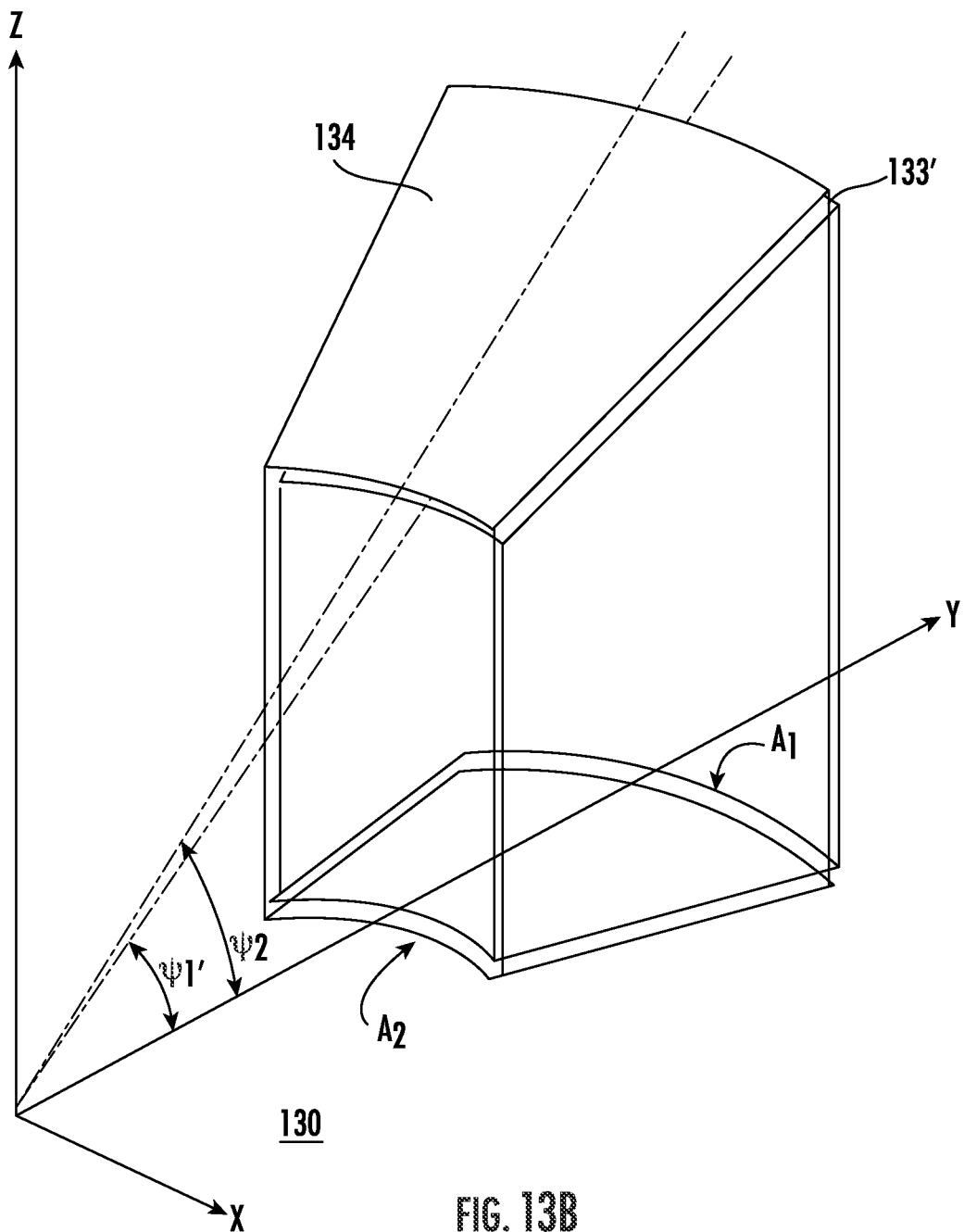

The system 230 illustratively includes a memory 231, a processor 232, and associated display 233. Beginning at Block 120 the processor 232 obtains geospatially registered first and second IFSAR images 133, 134 of a geographic area having respective first and second actual grazing angles $\psi_1$, $\psi_2$ with a difference ($\psi_1$-$\psi_2$) therebetween, at Block 122. The processor 232 converts the first IFSAR image 133 to a modified first IFSAR image 133' having a modified first grazing angle $\psi_1'$ (FIG. 13B) based upon known terrain elevation data for the geographic area, at Block 123. More particularly, the modified first grazing angle $\psi_1'$ is closer to the second actual grazing angle $\psi_2$ than the first actual grazing angle $\psi_1$. The processor 232 further recovers updated terrain elevation data for the geographic area based upon the modified first IFSAR image 133' and the second IFSAR image 134, at Block 124, which illustratively concludes the method of FIG. 12.

More particularly, the system 230 advantageously allows for the use of two registered complex IFSAR images of the same scene but with a grazing angle difference too large for unambiguous height determination. This is accomplished by converting one of the complex IFSAR images to an image with a much closer grazing angle to the other using sufficiently accurate a priori terrain knowledge (e.g., the estimated height map described above with reference to FIGS. 1-6), resulting in a different pair of images of the same scene to be used for interferometry and for which phase unwrapping may be successfully performed. As a result, the recovery of unambiguous terrain height from new interferometric phase is possible.

More particularly, a complex SAR image is the convolution of the ImPulse Response (IPR) with the product of the complex reflectivity of the scene and two-phase factors that depend on the geometry of the scene and the viewing angle. One of these phase factors can be made the same for two collects if the ratio of the cosine of the grazing angle and the center wavelength is kept constant. The phase of the other factor is proportional to the tangent of the collection grazing angle and the terrain height, and will be different for collects with differing grazing angles. If the two grazing angles are sufficiently close, a pair of images can be interfered and an estimate of terrain height can be obtained. However, if the grazing angles of the two collects are too different, then terrain variations can cause the interferometric phase to jump by more than 180° from pixel to pixel, making the 2D phase unwrap incorrectly, causing the terrain height to be ambiguous.

The system 30 advantageously enables terrain height estimation with larger grazing angle differences by using known terrain height knowledge to convert one image to an effective grazing angle closer to the other. This avoids the problem of height aliasing when interfering the two images. The processor 232 may obtain additional terrain height information by unambiguously interfering pairs of images that could not be used before. These additional estimates can be fused with other data to improve accuracy. This technique is referred to herein as "vertical basebanding" because it effectively removes the terrain height phase for one grazing angle, similar to shifting the center frequency to zero frequency for a signal. In contrast, the system 30 adds in a phase to convert to a different grazing angle, similar to frequency conversion. As noted above, this technique utilizes a priori terrain knowledge errors which are less than some fraction of the ambiguous height of the original pair of images. For large grazing angle differences, deconvolution may precede the conversion, followed by reconvolution.

Vertical basebanding allows terrain height estimates to be obtained, without aliasing, using pairs of images with larger than normally acceptable grazing angle differences. This approach assumes an initial knowledge of the terrain height, but then allows for the use of pairs of images that would ordinarily not be suitable for interferometry. This works by allowing an image at one grazing angle to be converted to an effective image at a different grazing angle. This way images may be paired and terrain height estimates obtained without aliasing, which was previously not possible for the pair of images since the grazing angles were too far apart. The grazing angles may be made to be as close as desired, but generally will be within a threshold range to avoid the above-noted phase wrapping problem.

Figure 14:
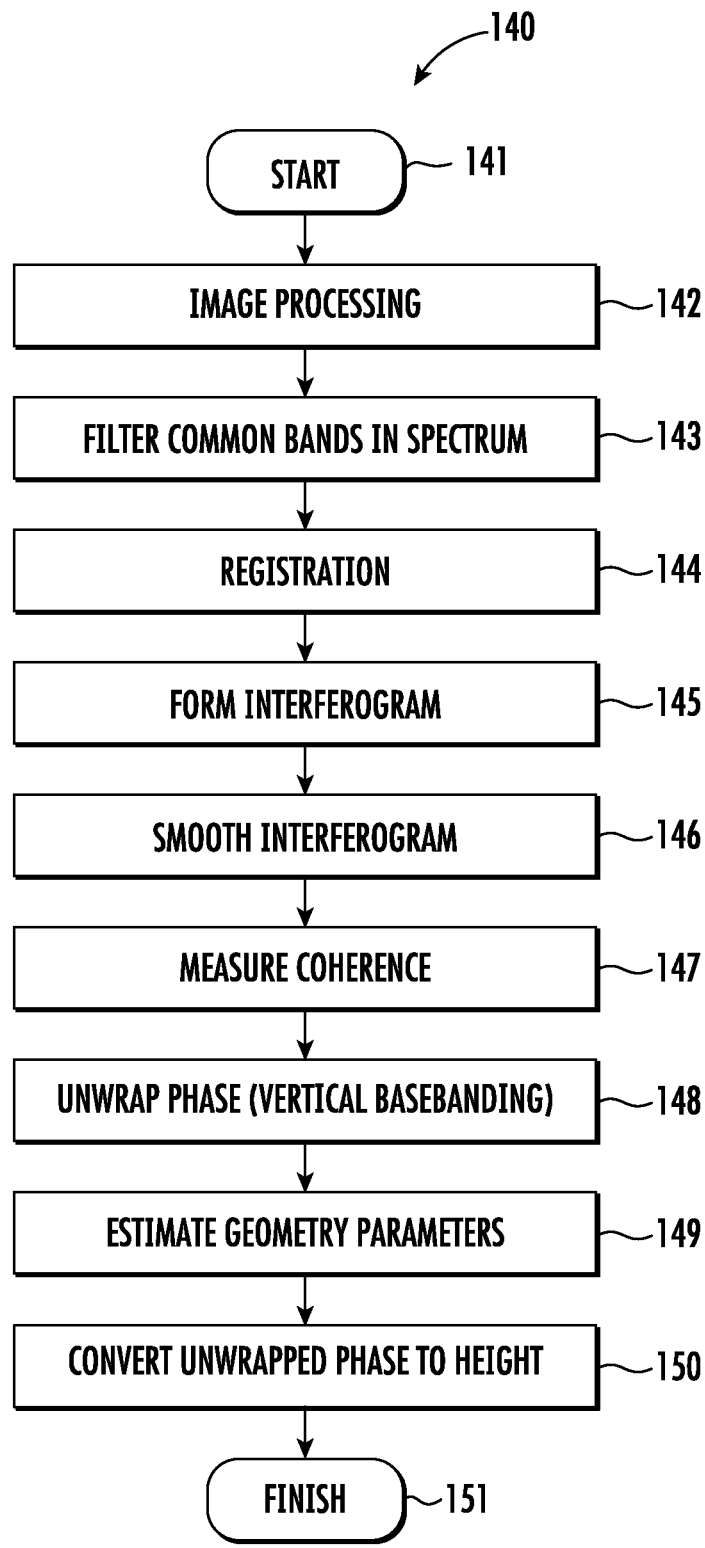
FIG. 14 is a flow diagram illustrating an example interferometric processing chain which may be implemented by the system of FIG. 11.

An example interferometric processing chain is illustrated in the flow diagram 140 of FIG. 14. Beginning at Block 141, image processing and filtering of common bands in the spectrum is performed prior to image registration (Blocks 142-144). Interferogram formation and smoothing are performed at Blocks 145-146, and coherence is measured at Block 147. It is at this point that the above-described phase unwrapping (vertical basebanding) operations may be performed, at Block 148, by converting one of the two grazing angles to be much closer to the other where they are initially separated by too large of an angular distance therebetween. From there, the appropriate geometry parameters may be estimated (Block 149), and the unwrapped phase may be converted to height, at Block 150. The method of FIG. 14 illustratively concludes at Block 151.

Figure 15:
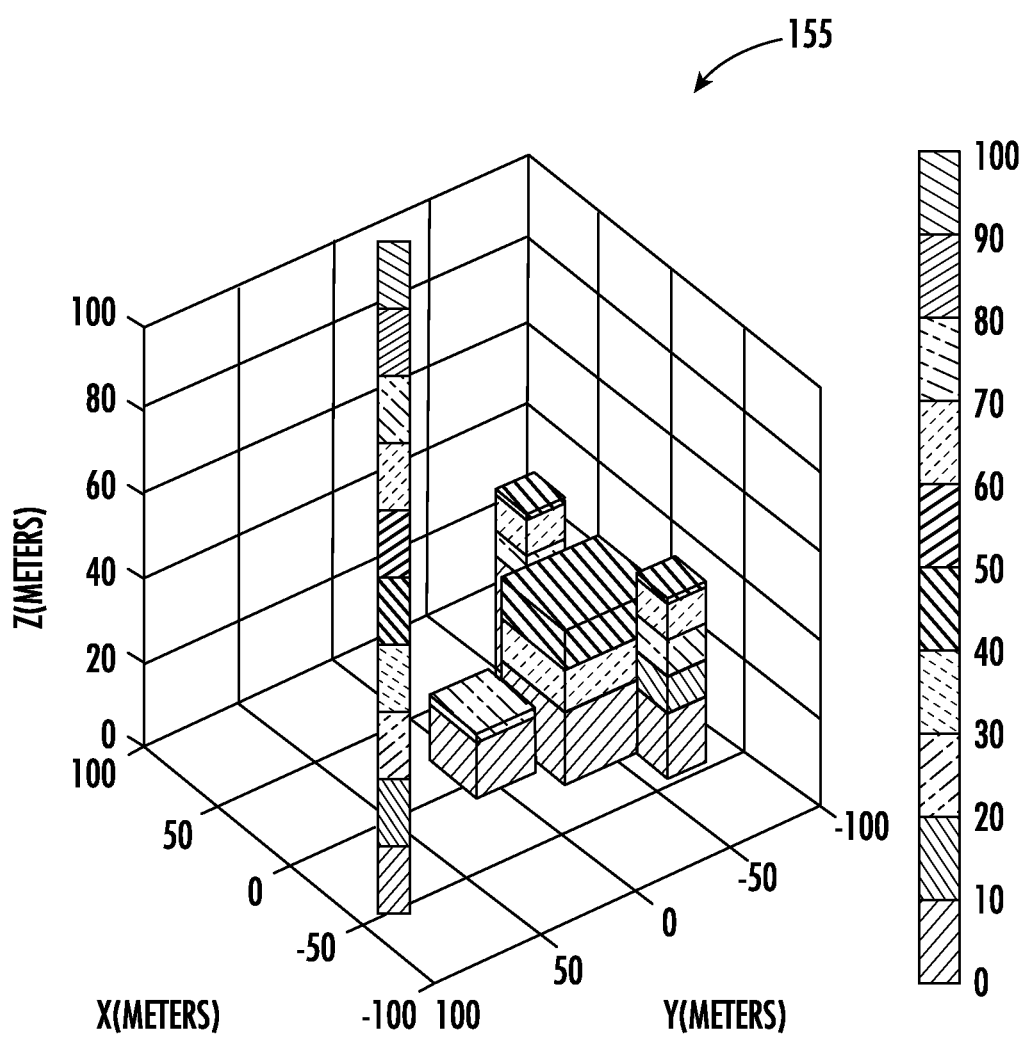
FIGS. 15-17 are a set of 3D graphs corresponding respectively to true height data for a geographic location, aliased height data recovered from initial wrapped interferometric phase for the geographic location, and height data recovered by the system of FIG. 11 from adjusted wrapped interferometric phase for the geographic location.
Figure 16:
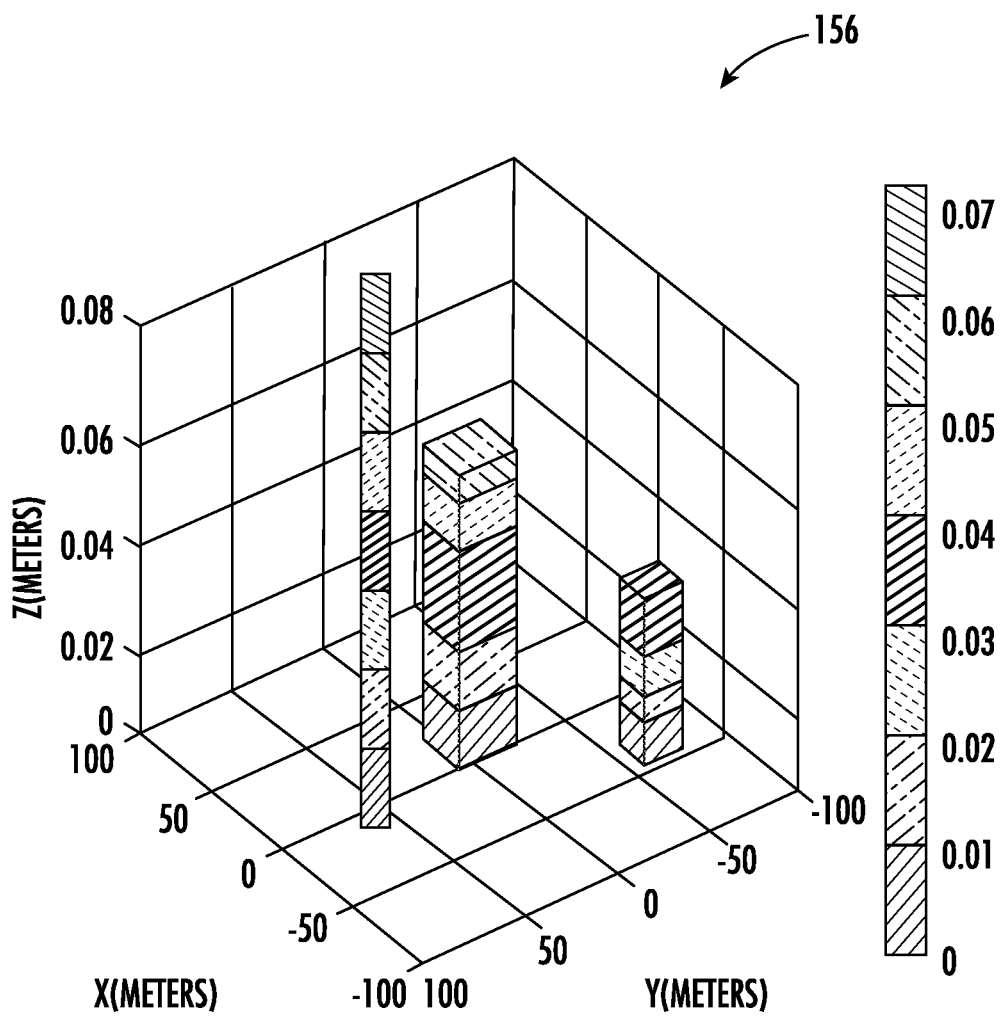
Figure 17:
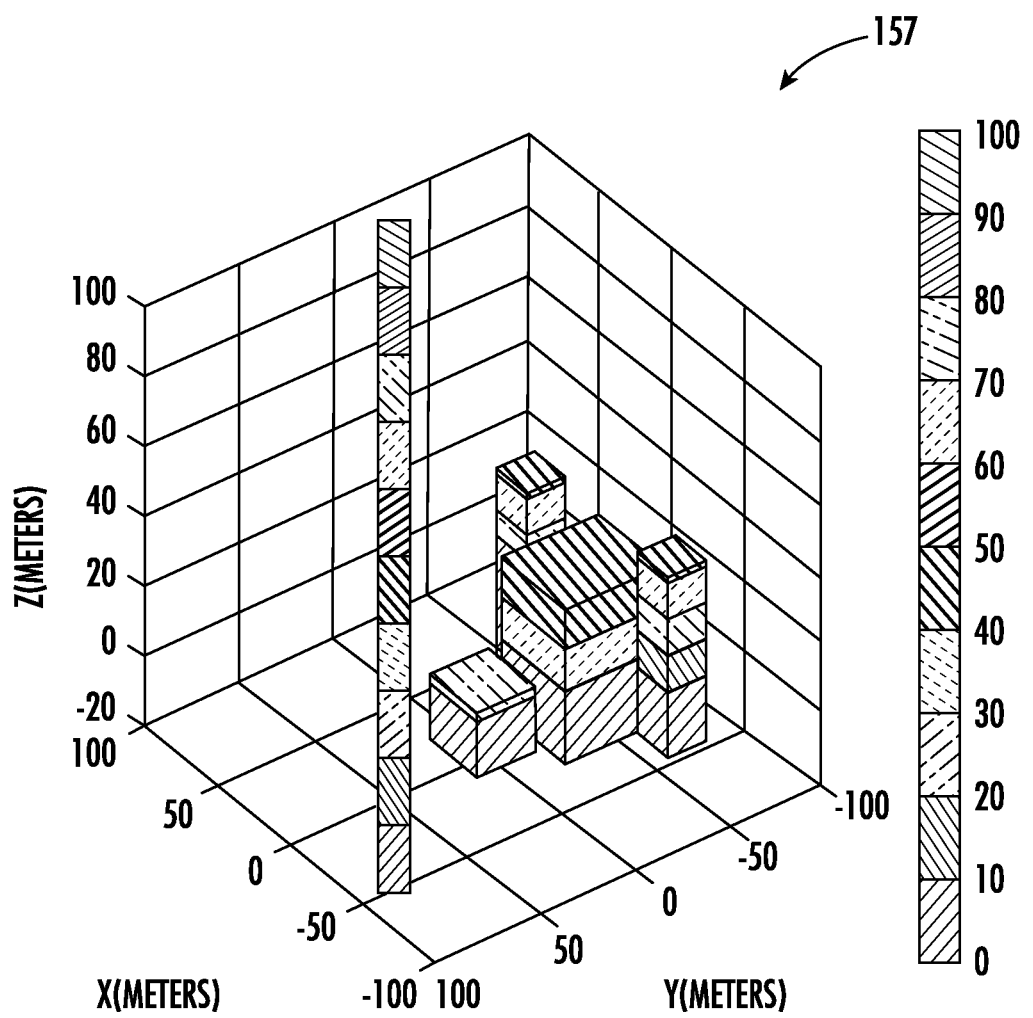

A simulated concept deconstruction is now described with respect to the 3D graphs 155-157 of FIGS. 15-17. The first graph 155 is a representation of the true height data for a simulated urban scene having a plurality of buildings therein, with a highest of the buildings being 100 m tall. The graph 156 shows aliased height data recovered from initial wrapped interferometric phase. As a result, the height data cannot be properly recovered from the initial phase, and it may be seen that the building heights do not match those of the true height data shown in the graph 155. On the other hand, the graph 157 shows height data recovered from the adjusted wrapped interferometric phase as described above. As seen in the graph 157, the height data is recovered to be substantially the same as the actual true height data shown in the graph 155.

The above-described approach advantageously allows for the conversion of imagery collected at one grazing angle to effective imagery at a different grazing angle, using an initial terrain height dataset for the transformation. This allows the use of new pairs of images for interferometry that could not previously be used, because of height aliasing due to the difference in grazing angles being too great for the terrain variation. Additional interferometric pairs may then be used to improve terrain estimation.

Additional details regarding vertical basebanding are now provided. The image has the following form $$f(u,v) = s_A(x,y) \otimes [r(x,y) e^{-j\beta Y_0 z(x,y)} e^{-jy Y_0}],$$

where here (u, v) are image coordinates, and (x, y, z) are the actual 3D coordinates of each pixel. $s_A$ is the 2D sinc function-like ImPulse Response (IPR) (which is the inverse Fourier transform of the aperture region A in spatial frequency space), r(x, y) is the true scene reflectivity, $\beta = \tan \psi$, where $\psi$ is the depression/grazing angle at the center of the collection aperture, $Y_0 = (4\pi/\lambda)\cos \psi$ is the spatial frequency offset in the ground plane-projected phase-history space, and z(x, y) is the terrain height function.

If the collects have two different grazing angles, then we can have the common baseband translation $Y_0$ by requiring the two center frequencies to obey $$Y_0 = \frac{4\pi}{\lambda_1} \cos\psi_1 = \frac{4\pi}{\lambda_2} \cos\psi_2.$$

This means that we use slightly different center frequencies for the two collects to align the aperture centers in the spatial frequency domain, when projected to the ground plane. Two images would then be the same except for the factors $e^{-j\beta Y_0 z(x,y)}$, which would be different since $\beta = \tan \psi$, and the two depression angles differ.

Defining the following convolution of the IPR with the product of the scene reflectance and phase factors, we have $$r_A(x,y) = s_A(x,y) \otimes [r(x,y) e^{-j\beta_f Y_0 z(x,y)} e^{-jy Y_0}].$$

If we have two images f and g with sufficiently close grazing angles $\psi_f$ and $\psi_g$, with some approximations the two images can be written as $$f(u,v)=r_A(x,y), g(u,v)=r_A(x,y)e^{j(\beta_f-\beta_g)Y_0 z(x,y)}.$$

For these two images, we assume that the apertures have been projected to the ground plane, and that a common aperture in the intersection has been used, with both apertures resampled to identical points. We also assume that the images have been perfectly registered, and for what follows we neglect noise. The images are assumed to lie in the ground plane, and to have a common baseband translation $Y_0$ in the ground plane. We can accordingly form the following image:

$$h(u,v)=f(u,v)e^{j\beta_f Y_0 z(x,y)}=g(u,v)e^{j\beta_g Y_0 z(x,y)}.$$

The new image h is independent of grazing angle, since we get the same image from collections with different grazing angles. It is as if the height data has been basebanded out of the images. This process is called vertical basebanding. The system 230 advantageously uses vertical basebanding to allow interferometric terrain height estimation by using pairs of images with greater grazing angle differences without height aliasing. It is assumed that we have an initial estimate of terrain height $z(x,y)$ at each point in the image, which can be gotten from application of a DEM, an interferometric pair with sufficiently close grazing angles, or other source.

We see that the image collected at grazing angle $\psi_f$ is given by $$f(u,v)=h(u,v)e^{-j\beta_f Y_0 z(x,y)},$$

where the image h is effectively independent of grazing angle; the grazing angle dependence has been removed from f to form h, by vertical basebanding. Let us suppose that the image $g(u, v)$ was collected at a grazing angle $\psi_g$ that differed too much from the grazing angle $\psi_f$ at which the image $f(u, v)$ was collected. We can then form a new image p from g by vertically basebanding g, then shifting to a grazing angle $\psi_p=\psi_f+\Delta\psi$, that is only very slightly different from f:

$$p(u, v) = g(u, v)e^{j\beta_g Y_0 z(x,y)}e^{-j\beta_p Y_0 z(x,y)}$$
$$= g(u, v)e^{j(\beta_g-\beta_p)Y_0 z(x,y)}$$
$$= r_A(x, y)e^{j(\beta_f-\beta_p)Y_0 z(x,y)}$$

Recall that $f(u, v)=r_A(x, y)$, $g(u, v)=r_A(x, y)e^{j(\beta_f-\beta_g)Y_0 z(x,y)}$. We then see that $$f^*g=|r_A|^2 e^{j(\beta_f-\beta_p)Y_0 z(x,y)}.$$

Thus we can get a new terrain height estimate from the unwrapped phase $\Psi(u, v)$ of $f^*g$ without any height aliasing if we choose $\Delta\psi$ small enough so that the aliased height is larger than the biggest pixel-to-pixel height change:

$$h_a = \frac{\lambda}{4}\frac{\cos\psi}{\Delta\psi} > \max(|\Delta z|).$$

Without following this procedure, the height of the terrain would alias when the phase jumped by more than $\pi$ radians from pixel to pixel.

Once we have the unwrapped phase, we can solve for the 3D coordinates of each pixel in the image as follows:

$$x = u - \tan\eta_g \frac{\lambda}{4\pi}\frac{\cos\psi_g}{\Delta\psi}\Psi(u, v)$$

$$y = v - \tan\psi_g \frac{\lambda}{4\pi}\frac{\cos\psi_g}{\Delta\psi}\Psi(u, v)$$

$$z = \frac{\lambda}{4\pi}\frac{\cos\psi_g}{\Delta\psi}\Psi(u, v)$$

Further details regarding recovering updated terrain elevation data from IFSAR images are provided in co-pending U.S. application Ser. No. 17/030,529 filed Sep. 24, 2020, which is hereby incorporated herein in its entirety by reference.

Figure 18:
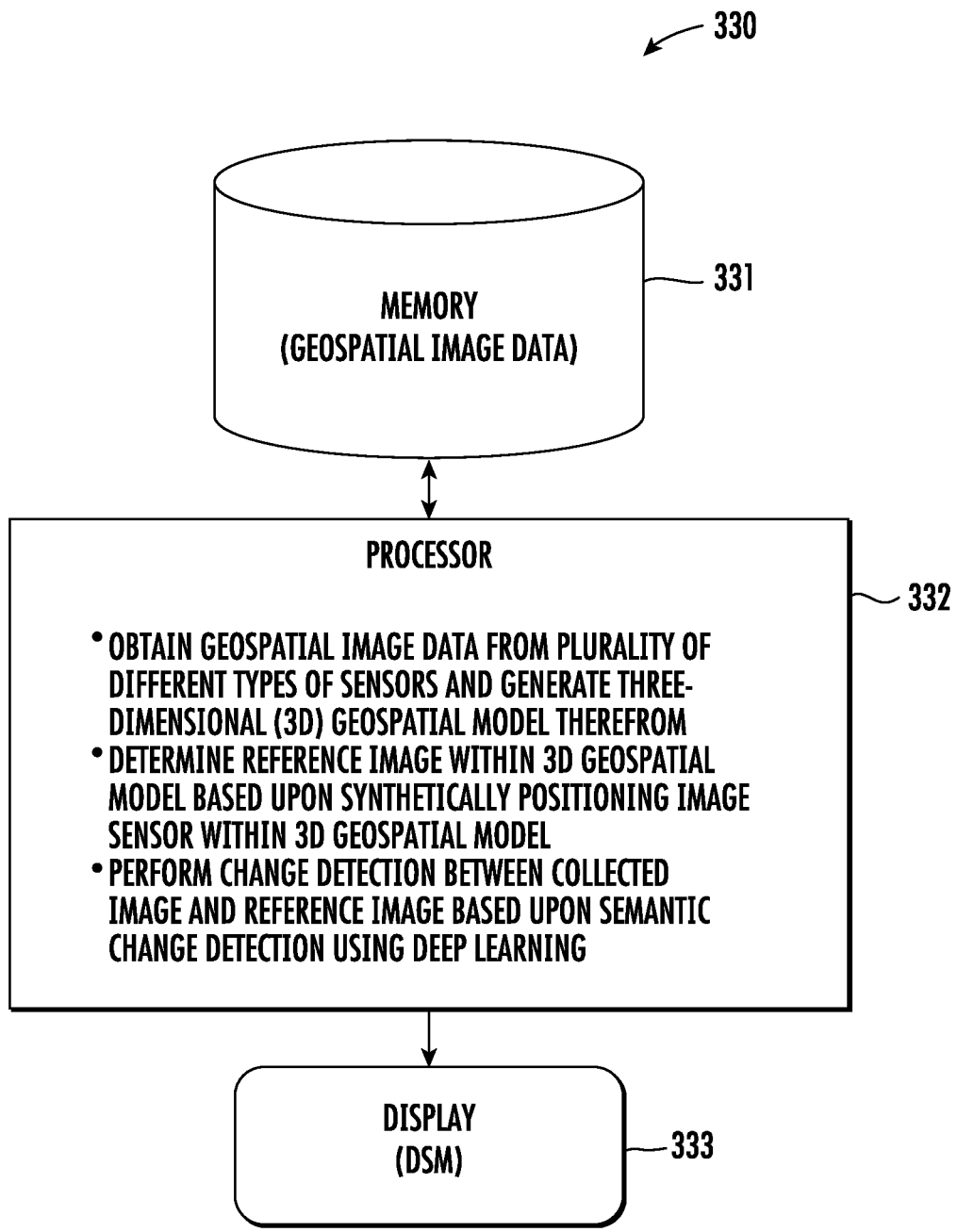
FIG. 18 is a schematic block diagram of a system for performing change detection between collected image and reference images based upon semantic change detection using deep learning in an example embodiment.
Figure 19:
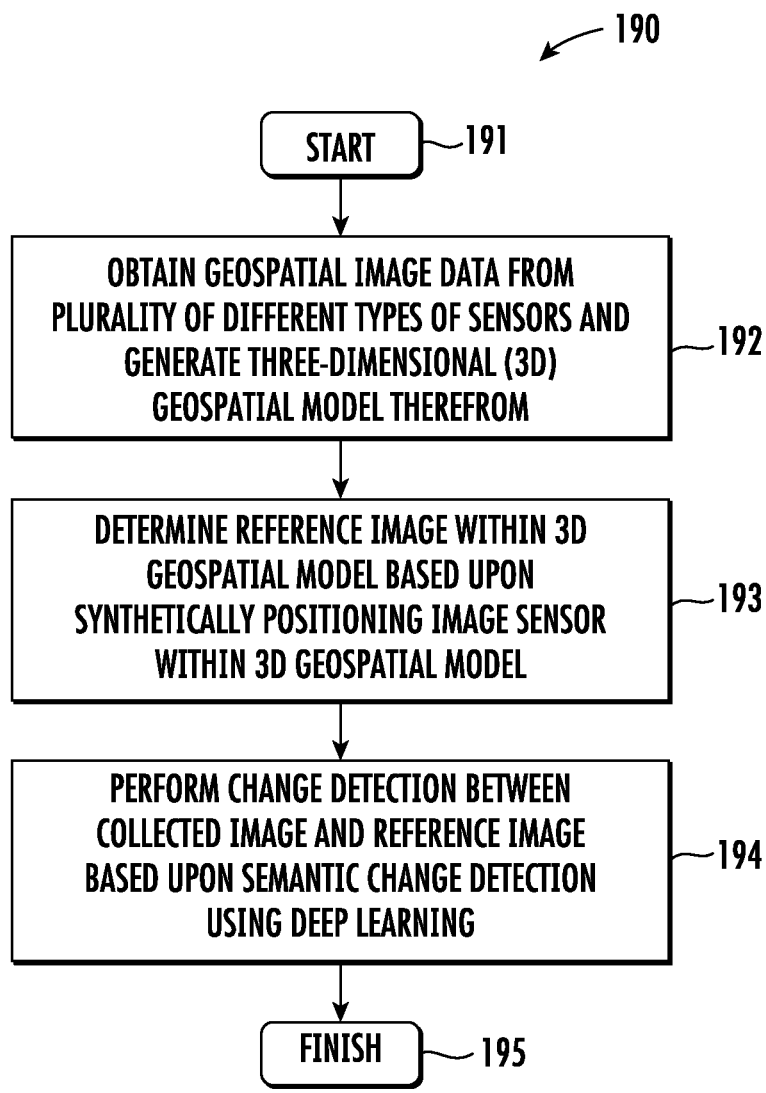
FIG. 19 is a flow diagram illustrating example method aspects which may be associated with the system of FIG. 18.

Turning to FIG. 18 and the flow diagram 190 of FIG. 19, a system 330 and associated method aspects are now described which may provide enhanced change detection in geospatial data sets. By way of background, change detection (understanding changes) and resulting track extraction (understanding activities) are important to intelligence community and commercial GIS-related applications. Given the recent explosion in available imagery data and the increasing number of areas-of-interest throughout the world, there is an increasing trend toward rapid, automated change detection algorithms. To ensure effective use of these imagery databases, care should be taken to verify that the new imagery matches the existing imagery in terms of coverage, field-of-view, spectral content, and, most notably, sensor location and viewpoint.

In addition, a need exists to reliably monitor change over time to determine the route of objects (movers), using persistent change detection to derive tracks from multi-int, multi-modal data, if the collection cadences are adequate to determine activity, e.g., multiple frames per hour. This may be problematic in that it is often time-consuming, difficult or even impossible to obtain, process and correlate imagery from multi-modal sources to generate persistent change detections and track extractions. The challenges include image-to-image registration; multi-modal image-to-image co-registration; and image-to-ground multi-modal registration. As a result, large amounts of collected multi-modal imagery may go underutilized in terms of the potential for change detection and track extractions given lost opportunities for detailed analyses of change over time.

Generation and maintenance of a Virtual Persistent Data Volume enables the creation of 2D, 3D, and 4D change detection products. It also enables the separation of the virtual products' background and foreground, which allows for derivation of virtual track data (activity). Change detection involves the combined processing of elevation model differences (3D), multi-modal imagery content (2D), and voxel-level historical volumetric attribution. An automated method compares a collected image to a reference (source) image extracted from a pre-existing 3D scene (site model, LIDAR model, high-res DEM, etc.) through a synthetic camera created and placed in the scene such that it matches the collected image sensor's location and parameterization (e.g., field-of-view, hyperspectral vs. monochromatic, etc.). Furthermore, relevant known and stored historical "real-world" phenomenology, such as atmospheric and time-of-day effects, overall ground lighting/reflectivity properties (e.g., soil/vegetation/water), etc., can be simulated in the scene before the reference image is extracted for enhanced change detection performance. An automated method to co-register multi-int data enables the generation of predictive and forensic products that creates a Virtual Persistent Data Volume from any input source.

An important application is the use of single-channel SAR data with Moving Reference Processing (MRP) to focus and geolocate moving targets. Moving targets within a standard SAR image scene are defocused, displaced, or completely missing in the final image. The SAR-MRP method focuses and geolocates moving targets by reprocessing the SAR data to focus on the movers rather than the stationary clutter. SAR change detection is used so that target detection and focusing is performed more robustly.

The current state of the art in change detection involves either: (1) accurate geo-registration of two images (reference and new collect) together so that automated change detection algorithms will have a high-rate of success; or (2) performing sophisticated pixel-correlation change detection algorithms which tend to be slow, iterative in nature, and manually intensive, since algorithms often require operator interaction/adjustment/control per execution. The first case may require a high degree of correlation in the location and parameters of the sensor (or sensors, if they're different) between the two collects. The traditional method for change detections is 2D image-to-image comparison. The second case does not require as high a degree of correlation (though some is still needed), but it may be neither automated nor fast. Neither of these approaches may be typically satisfactory.

An emerging trend, which has not been linked to this problem until now, is interest in the rapid generation and exploitation of persistent 3D scene products (site models, LIDAR models, high-res DEMs, etc.). A second trend of interest is higher persistence's support of the ability to separate foreground from background imagery allowing detection of activity (movers).

The system 330 advantageously provides for generation and maintenance of a Virtual Persistent Data Volume which, in turn permits creation of 2D, 3D, 4D change detection products, and permits the separation of the virtual products' background and foreground allowing derivation of virtual track data (activity). Moreover, the system 330 may also advantageously allow for change detection through a combined process of: elevation model differences (3D); multi-modal imagery content (2D; and voxel-level historical volumetric attribution.

More particularly, the system 330 illustratively includes a memory 331, processor, 332, and a display 333 similar to those discussed above. Beginning at Block 191, the processor 332 obtains geospatial image data from a plurality of different types of sensors (e.g., EO, LIDAR, IR, SAR/IFSAR, etc.) and generates a 3D geospatial model therefrom, at Block 192. The processor 332 further determines a reference image within the 3D geospatial model based upon synthetically positioning an image sensor within the 3D geospatial model, at Block 193, and performs change detection between a collected image and the reference image based upon semantic change detection using deep learning, as discussed further above, at Block 194. The method of FIG. 19 illustratively concludes at Block 195.

The system 330 provides for an automated approach whereby a collected image is compared to a reference (source) image extracted from a pre-existing 3D scene (site model, LIDAR model, high-res DEM, etc.) through a synthetic camera which is created and placed in the scene in such a way as to match the collected image sensor's location and parameterization (e.g., field-of-view, hyperspectral vs. monochromatic, etc.). Further, relevant known and stored historical "real-world" phenomenology such as atmospheric and time-of-day effects, overall ground lighting/reflectivity properties (e.g., soil/vegetation/water), etc., can be simulated in the scene before the reference image is extracted for enhanced change detection performance. Moreover, the system 30 provides an automated approach to co-register multi-int data and the ability to generate predictive and forensic products which creates a Virtual Persistent Data Volume from different input sources.

Figure 23:
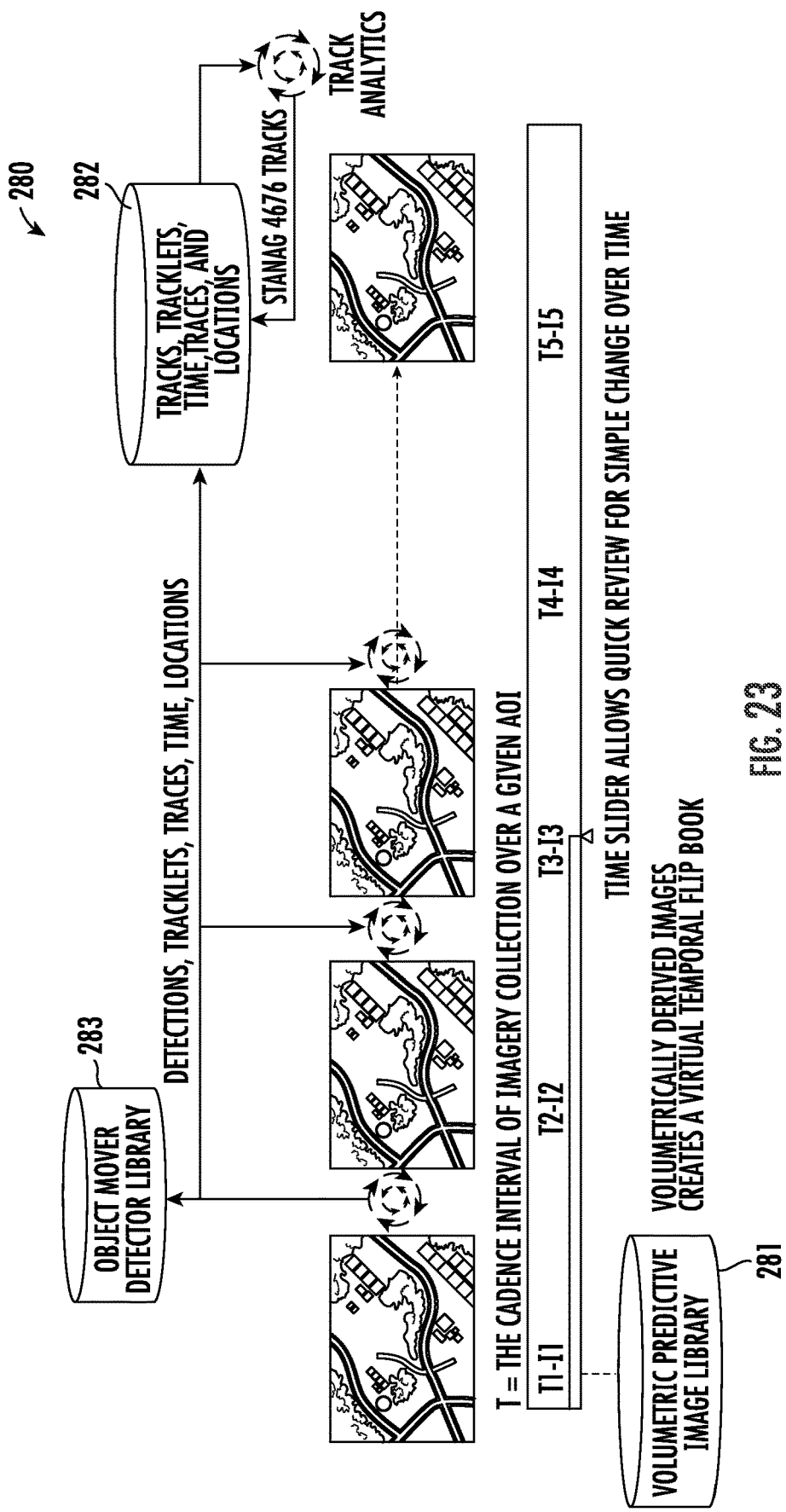
FIG. 23 is a schematic block diagram of a change detection configuration which may be implemented using the system of FIG. 18 in accordance with an example embodiment.

In an example configuration 280 now described with reference to FIG. 23, a volumetric predictive image library 280 provides volumetrically derived images. Multiple objects are detected in each image, which are considered tracks/tracklets/traces, and they are stored along with respective times and locations in a database 281. The detection is performed over a given area of interest (AOI) represented in a DSM 283, and as the cadence of imagery collection reaches sub-hour intervals, the derived detections allow the generation of tracks. Derived tracks of movers over AOIs from multi-int multi-source image allow the forensic analysis of objects of interest based upon an object mover detector library 282. While such approaches have been used in motion imagery collections with respect to a given target, they are not achievable using current systems from multi-source, multi-int data over an entire AOI. As collection cadence decreases from multiple sources of virtual imagery co-registered in space, this becomes a practical approach to deriving tracks of objects of interest.

The reward matrix with CNN deep learning model described above with reference to FIGS. 4-6 may be used for these detection operations. Moreover, Q-Learning may also be applied. More particularly, reinforcement learning (RL) is an area of machine learning concerned with how a processor should take actions in order to maximize cumulative reward. Q-Learning is a reinforcement learning algorithm that seeks to find the best action to take given the current state. Q-Learning seeks to learn a policy that maximizes the total reward. When pixel land cover classification is learned, the optimal classification weight can be updated by combining the predicted values from previous observation. Q-Learning may be defied as follows:

$$newWeight = \frac{(1 - errorA, B, C, D, E_{nom}) * (NashEquilibriumValue)}{\Sigma_{vparams}(1 - errorA, B, C, D, E_{nom}) * (NashEquilibriumValue)}$$

where A, B, C, D, and E are land cover feature classes.

QLearnedWeight=oldWeight+learningRate*(newWeight−oldWeight)

Figure 20:
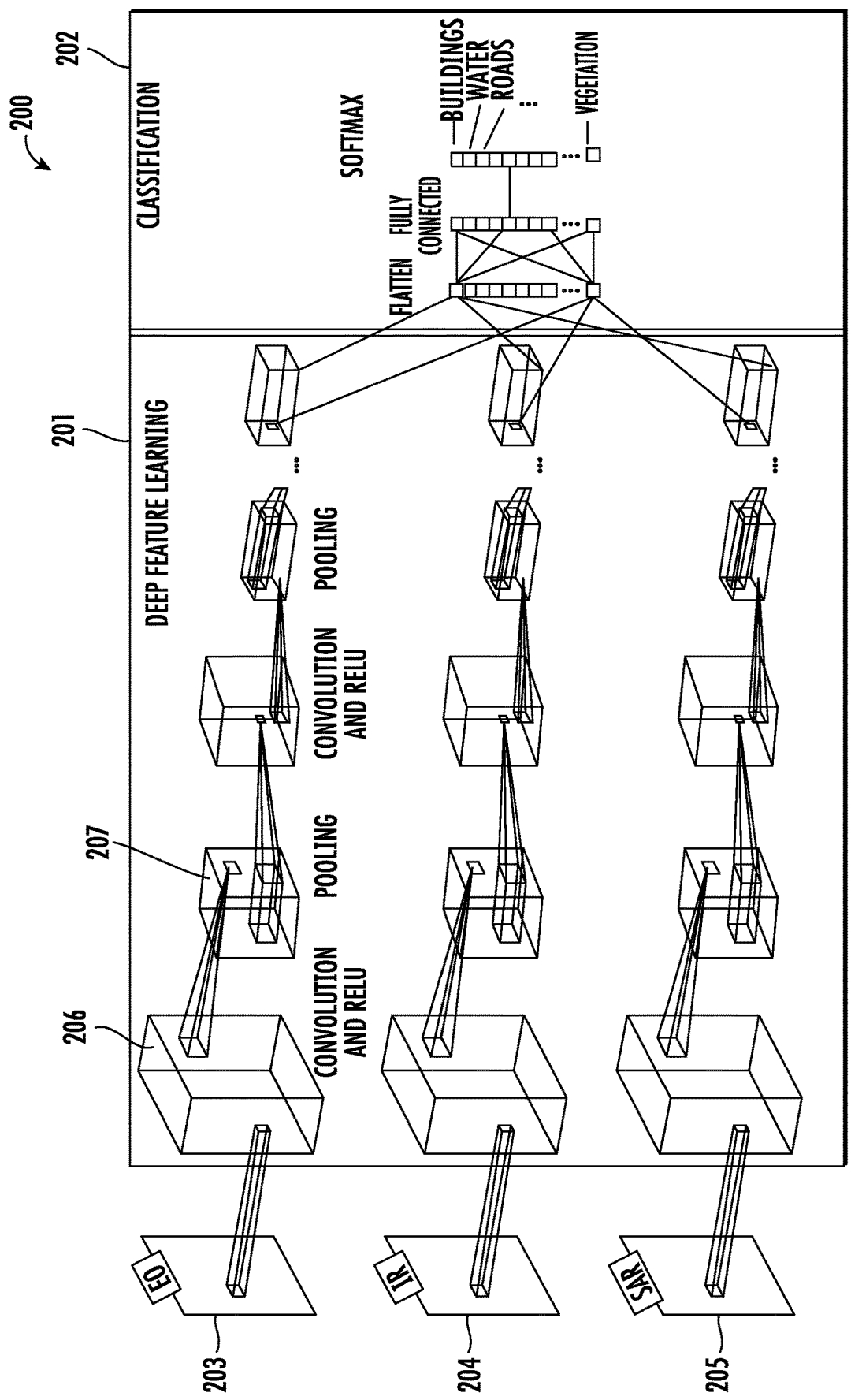
FIG. 20 is an example convolutional neural network (CNN) architecture which may be implemented by the system of FIG. 18.

An example CNN 200 which may be used in accordance with the present example is now described with reference to FIG. 20. The CNN 200 illustratively includes a deep feature learning section 201 and a classification section 202. Three different processing paths are provided through the deep feature learning section 201 corresponding to respective different EO, IR, and SAR input sources 203-205. Each of the processing paths includes respective convolution and Rectified Linear Units (ReLUs) 206 and pooling units 207, and the outputs of the processing paths are collectively classified using the above-described classifications (e.g., buildings, water, roads, vegetation, etc.) through a plurality of stages as shown in the classification section 202.

Deep learning is accordingly used to classify land cover features using all modalities with grouped convolution. This treats each modality (EO, IR, SAR, LIDAR, etc.) independently and fuses and weights each modality channel. Using an ensemble of grouped CNN models with several stochastic gradient descent solvers, a reward matrix of models vs. features may be created and a linear program may be used by the processor 332 to decide which model is best per pixel. Moreover, reinforcement Q-Learning is used to optimally weight and update the pixel classification probability per new observation. As noted above, correct land cover feature classification is important for persistent surveillance and tracking.

In the CNN 200, a 2D grouped convolutional layer separates the input channels into groups and applies sliding convolutional filters. Grouped convolutional layers are used for channel-wise separable (also known as depth-wise separable) convolution. For each group, the layer convolves the input by moving the filters along the input vertically and horizontally and computing the dot product of the weights and the input, and then adding a bias term. The layer combines the convolutions for each group independently. If the number of groups is equal to the number of channels, then this layer performs channel-wise convolution.

Figure 21:
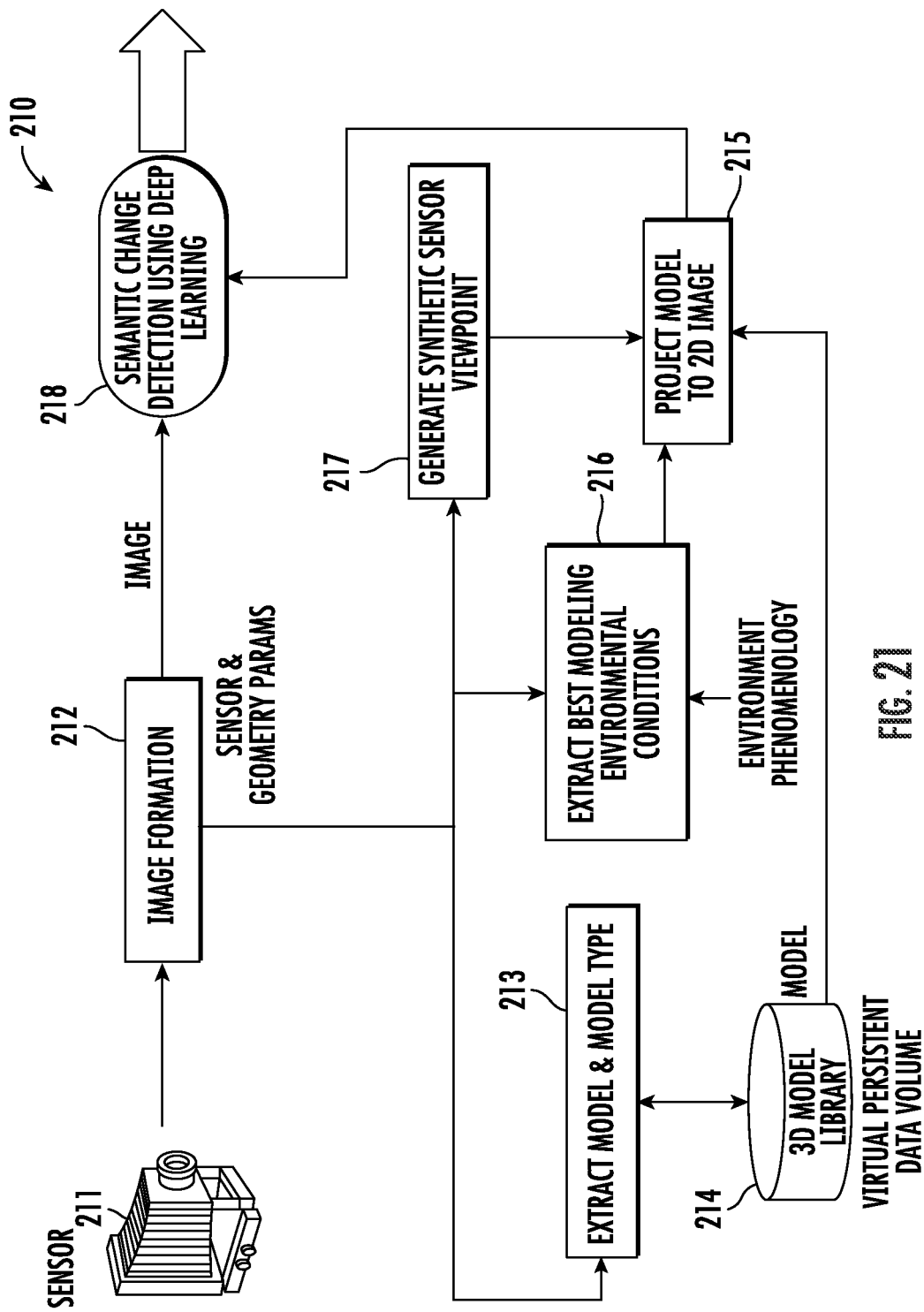
FIG. 21 is a flow diagram illustrating an example processing flow by the system of FIG. 18.

Referring now additionally to the flow diagram 210 of FIG. 21, various method aspects relating to image change detection are now explained. An image sensor (e.g., IR, EO, LIDAR, IFSAR/SAR, etc.) is used to generate the collected geospatial image and the geospatial collection values, and/or image sensor parameters (Block 212). Thereafter, the model and model type may be extracted from the geospatial scene model database (Block 213) and provided to a 3D model library 214, which is used generate a 2D reference geospatial image (Block 215). In some embodiments, the appropriate environmental condition(s) or phenomenology (e.g., corresponding to the conditions present when image formation occurred) may be determined or extracted (Block 216) and applied and further used in the generation of the reference geospatial image (Block 215). Moreover, a virtual geospatial image sensor is synthetically positioned with the geospatial scene model, at Block 217, and its output is also used to generate the reference geospatial image (Block 215). The collected geospatial image and the reference geospatial image are then compared based upon semantic change detection using deep learning as described above to provide the change detection (Block 218). Further details regarding change detection with respect to different types of sensors (e.g., EO, SAR, IR, etc.) are provided in the above-noted U.S. Pat. No. 7,528,938 to Garceau et al.

Figure 22:
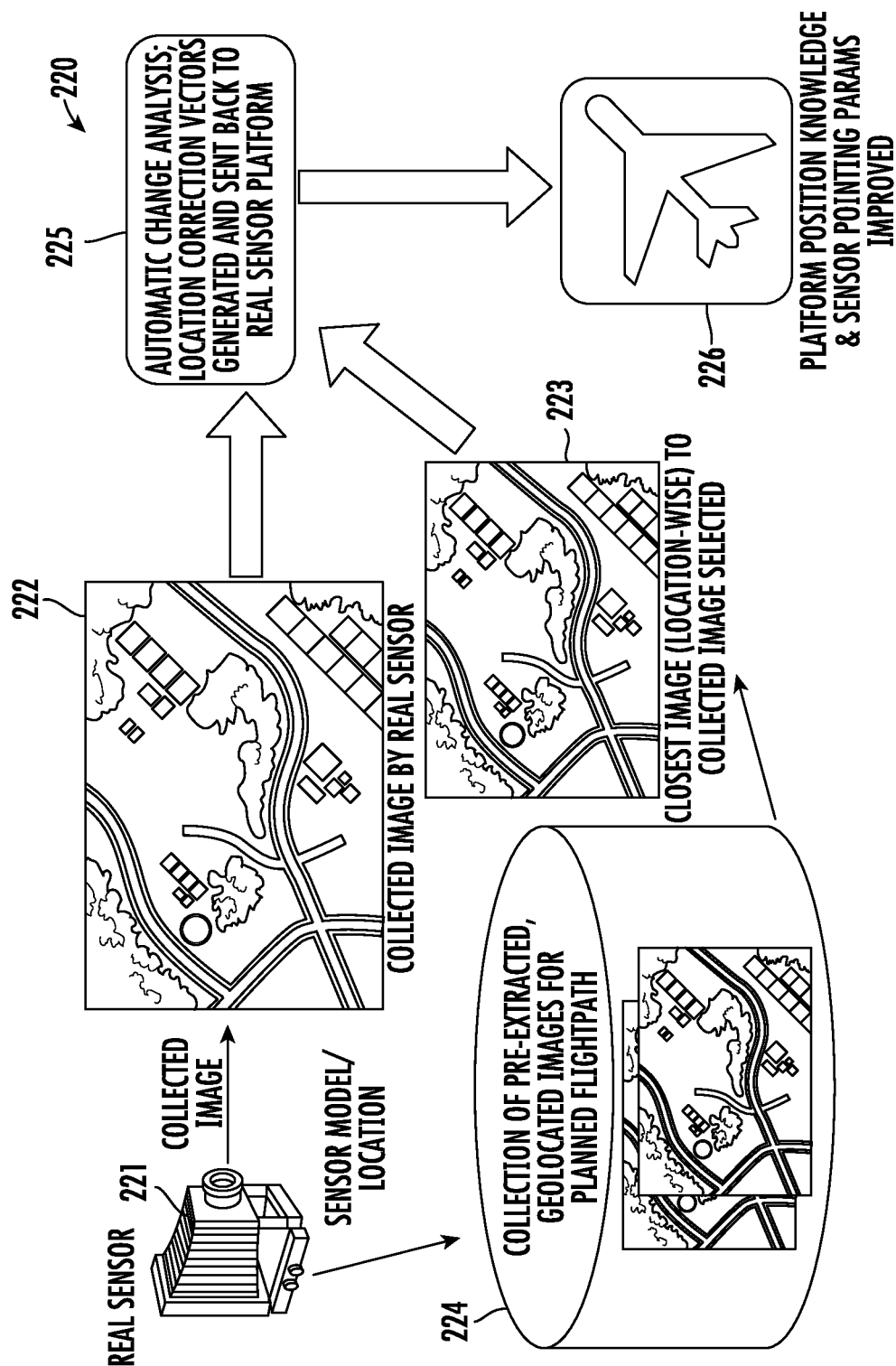
FIG. 22 is a flow diagram of an example processing flow by the system of FIG. 18 providing real-time automatic change analysis and feedback to the image capture platform.

In one example implementation now described with reference to the flow diagram 220 of FIG. 22, collected images 222 from an image sensor 221 (e.g., IR, EO, LIDAR, IFSAR/SAR, etc.) may be compared to a closest image 223 (e.g., in terms of location) to the collected image available in a database 224 including a collection of pre-extracted, geolocated images corresponding to a planned flight path. The processor 332 may accordingly perform the above-described automatic deep learning change analysis from the collected image 222 and the closest image 223 to generate location correction vectors (Block 225), which may be sent back to the collection platform 226 for the sensor 221 (an airplane in the illustrated example). This advantageously provides a real-time approach to updating and improving position knowledge and sensor pointing parameters.

The system 330 advantageously provides a virtual persistent data volume with multi-modality voxel level registration accuracy, voxel-level historical attribution of "real-world" phenomenology, an enhanced ability to perform cross-sensor change detection, and minimization of false positives with (multi-modal) synthesis of 3D shadow artifacts. Moreover, it also provide the ability to quickly and potentially automatically synthesize known "real-world" conditions to better match collected imagery and improve change detection results. This, in turn, allows for enhanced freedom in sensor positioning for reference data extraction, as well as in camera parameterization (i.e., sensor modeling) including modality. This approach may be extended to radar, polarization, hyperspectral, etc., and allows for automated 2D change detection from 3D source/reference data. As noted above, 3D source data may be a variety of different types (e.g., LIDAR models, high-res DEMS, etc.). Further details regarding enhanced change detection in geospatial data sets are provided in co-pending U.S. application Ser. No. 17/030,501 filed Sep. 24, 2020, which is hereby incorporated herein in its entirety by reference.

The foregoing disclosure provides a system for estimating pixel heights from a single multispectral RGB image, with or without sensor metadata. System components may include an ensemble of convolutional-deconvolutional neural network (CNN) models and an optimization function. The chosen deep learning network model has been validated on a per pixel basis using high-resolution aerial RGB imagery and LIDAR datasets.

Furthermore, the data knowledgebase described above provides historic, time-stamped, multi-modal data for registration and 3D feature classification. Given a large amount of height truth data, a model may be trained to recognize image features of differing heights using CNN image-to-LIDAR regression. The models, when applied to an unseen image, estimate a preliminary height per pixel, based on a learned feature set. Multiple models may be created and trained end-to-end and the best model and results were determined.

Furthermore, linear programming optimization may be used with an ensemble of regression models and semantic segmentation information with a weighted classification model to select optimized pixel height estimates. Semantic segmentation datasets help classify RGB imagery with feature class labels and refine land use feature classification with CNN classification to improve accuracy. Each land use classified feature may be weighted with a confidence metric that is used to help determine height information.

Additionally, CNN regression may be used for preliminary height estimation and CNN classification for land use feature classification plus a linear programming reward matrix per pixel to automatically decide optimized height estimation. An updated volumetric knowledgebase may include the system output and may be used subsequently for change detection and situational awareness. One or more of the techniques described herein may also be implemented in a non-transitory computer-readable medium having computer-executable instructions for performing the various operations described above.

Figure 24:
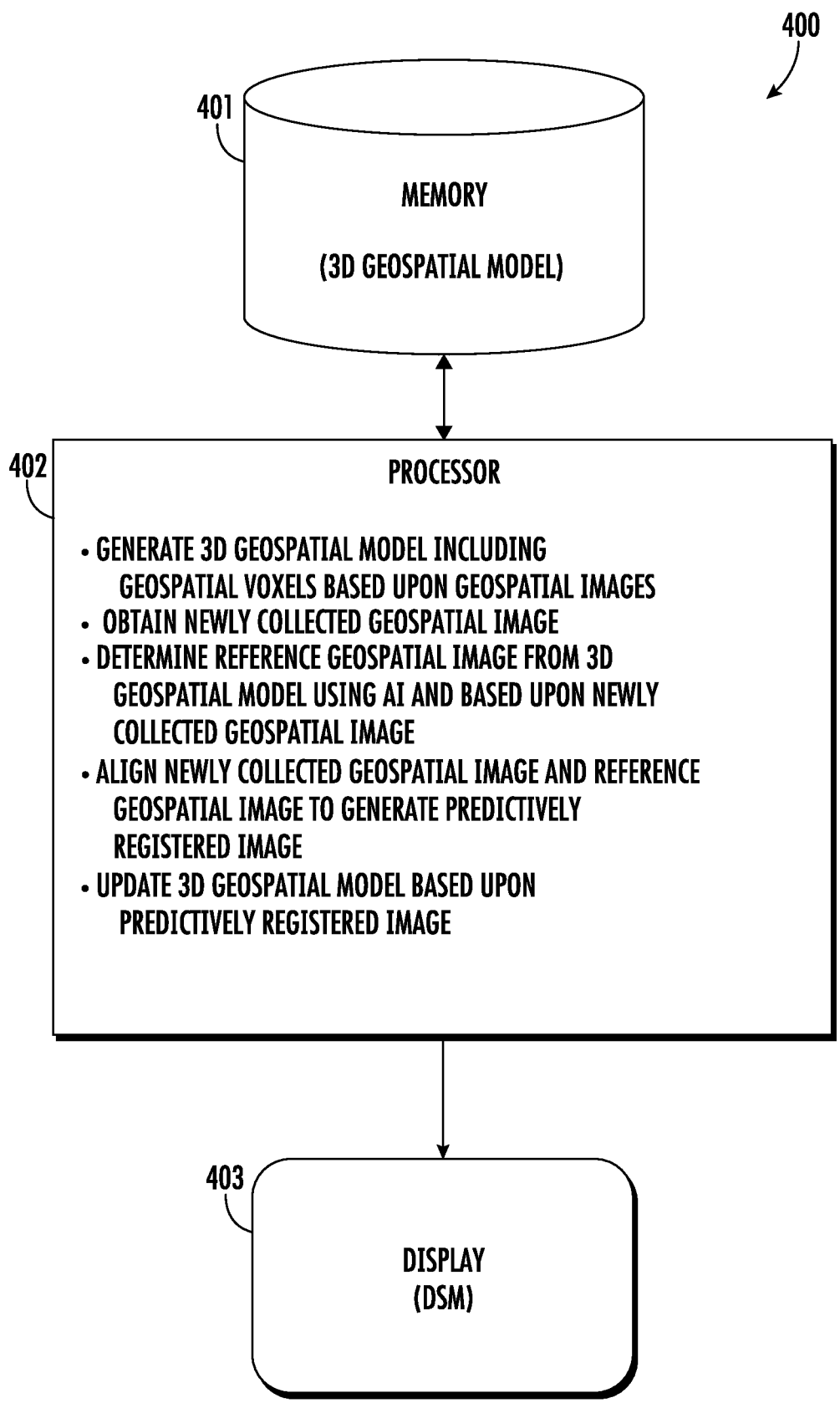
FIG. 24 is a schematic block diagram of a system for predictive registration of new images to a multi-modality volume in accordance with an example embodiment.
Figure 25:
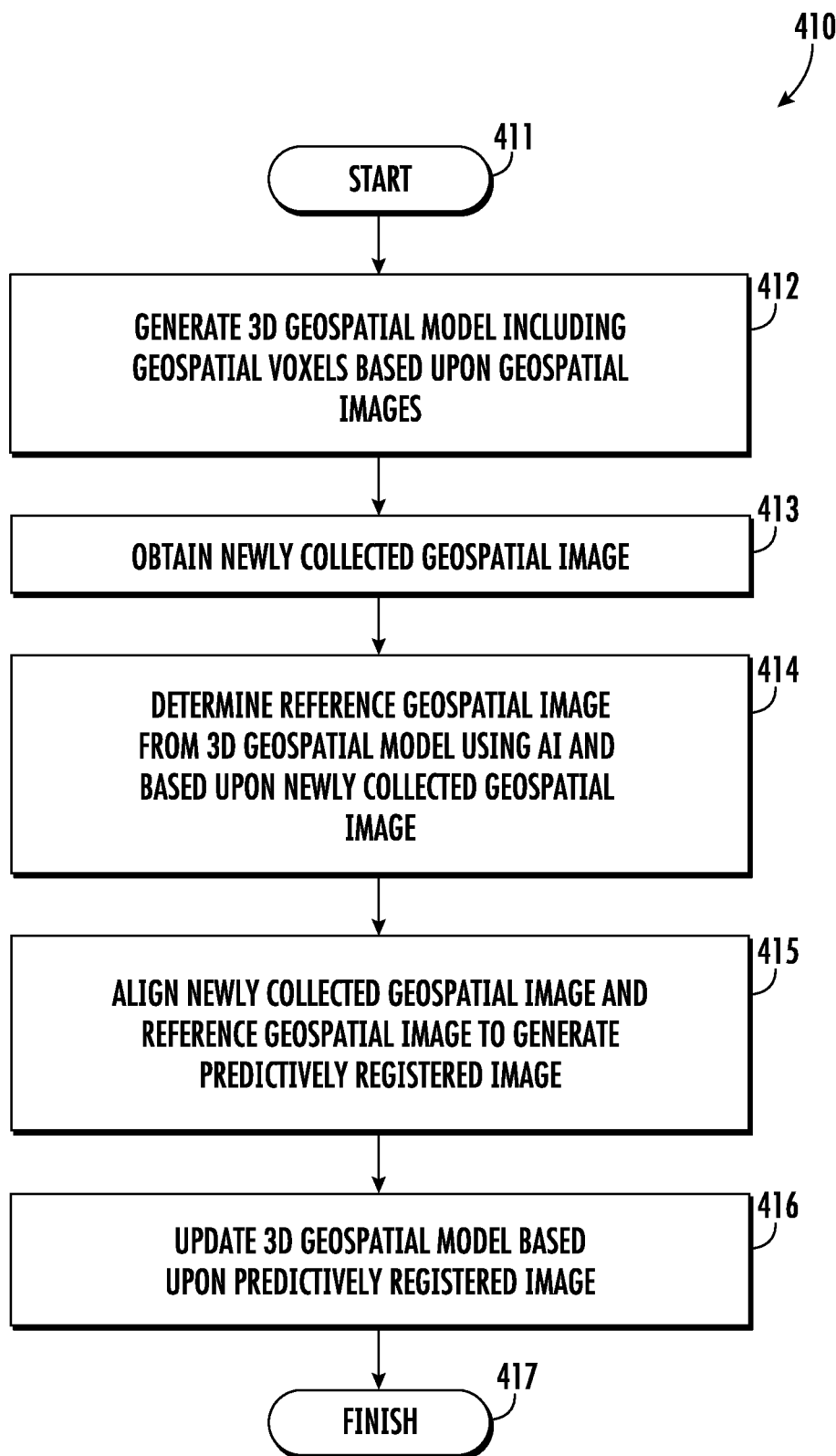
FIG. 25 is a flow diagram illustrating example method aspects associated with the system of FIG. 24.

Turning now to FIG. 24 and the associated flow diagram 410 of FIG. 25, a geospatial modeling system 400 providing predictive image registration and related method aspects are now described. The system 400 illustratively includes a memory 401, processor 402, and display 403 similar to those discussed above. Beginning at Block 411, the processor 402 generates a 3D geospatial model (e.g., DSM, etc.) from a volume including geospatial voxels based upon a plurality of geospatial images (Block 412), obtains a newly collected geospatial image (Block 413), and determines a reference geospatial image from the 3D geospatial model using AI and based upon the newly collected geospatial image, at Block 414. The processor 402 further illustratively aligns the newly collected geospatial image and the reference geospatial image to generate a predictively registered image, at Block 415, and updates the 3D geospatial model based upon the predictively registered image, at Block 416. As noted above, the model may be output to the display 403 by the processor 402. The method of FIG. 24 illustratively concludes at Block 417.

Figure 26:
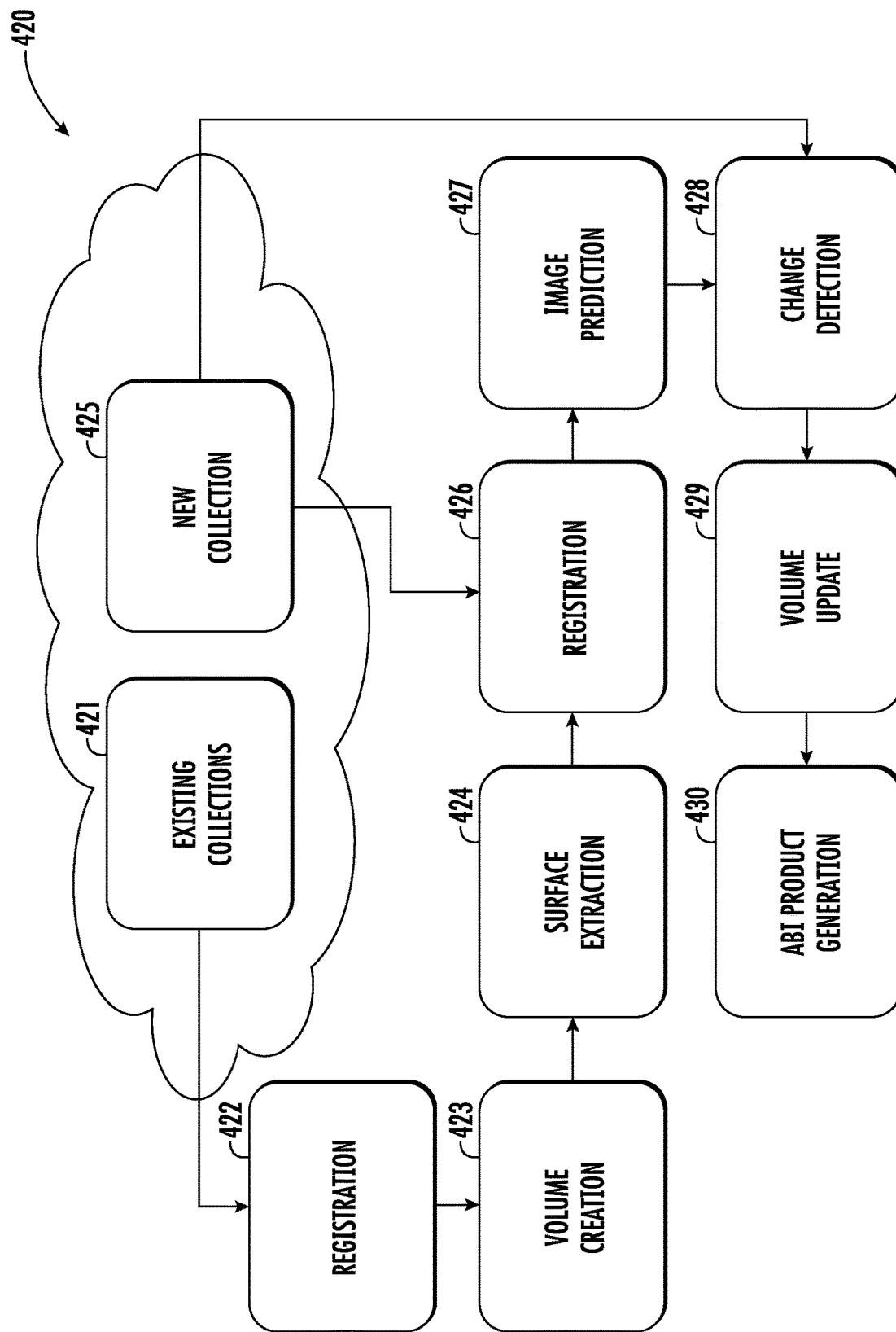
FIG. 26 is a flow diagram illustrating registration of images to a multi-modal volume in accordance with an example configuration.
Figure 27:
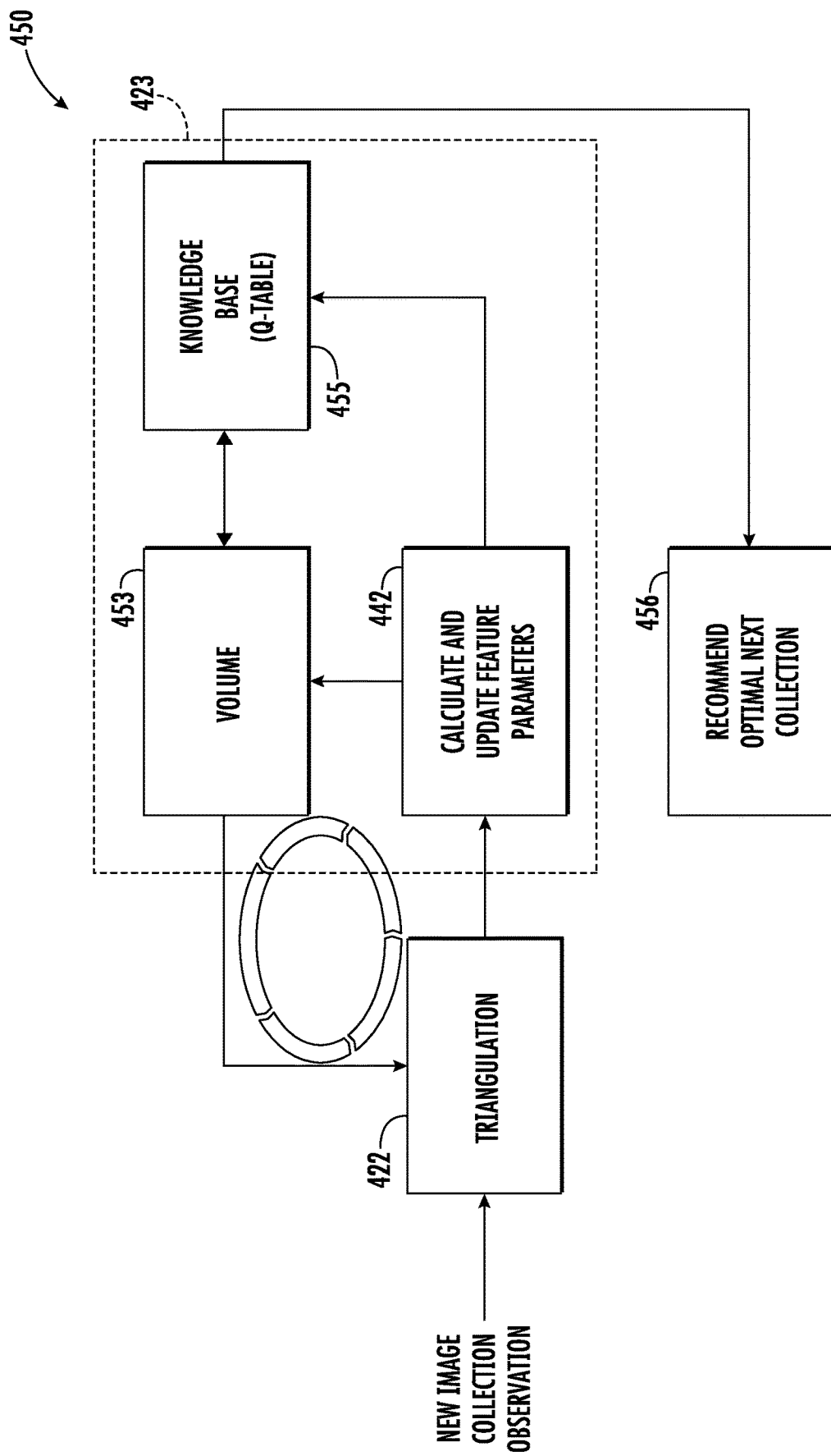
FIG. 27 is a flow diagram illustrating the registration and volume creation operations of FIG. 26 in greater detail.

The foregoing will now be described further with reference to FIGS. 26-28. In the flow diagram 420 of FIG. 26, an existing collection of images 421 (e.g., RGB, LIDAR, IFSAR, etc.) may be registered (Block 422) to create a multi-modal volume 453 (Block 423). More particularly, the initial registration may involve triangulation and bundle adjustment of intersecting polygons for triangulation grouping (FIG. 27). Generally speaking, the triangulation processing looks for patches of similarity between the different images after projecting them onto a surface, so that the similar patches align at the same height. While this provides a good initial estimation, triangulation does not always result in desired accuracy levels, and can be relatively time consuming. Further details regarding registration and volume creation aspects which may be used in different embodiments are described above with reference to FIGS. 1-17.

Figure 3:
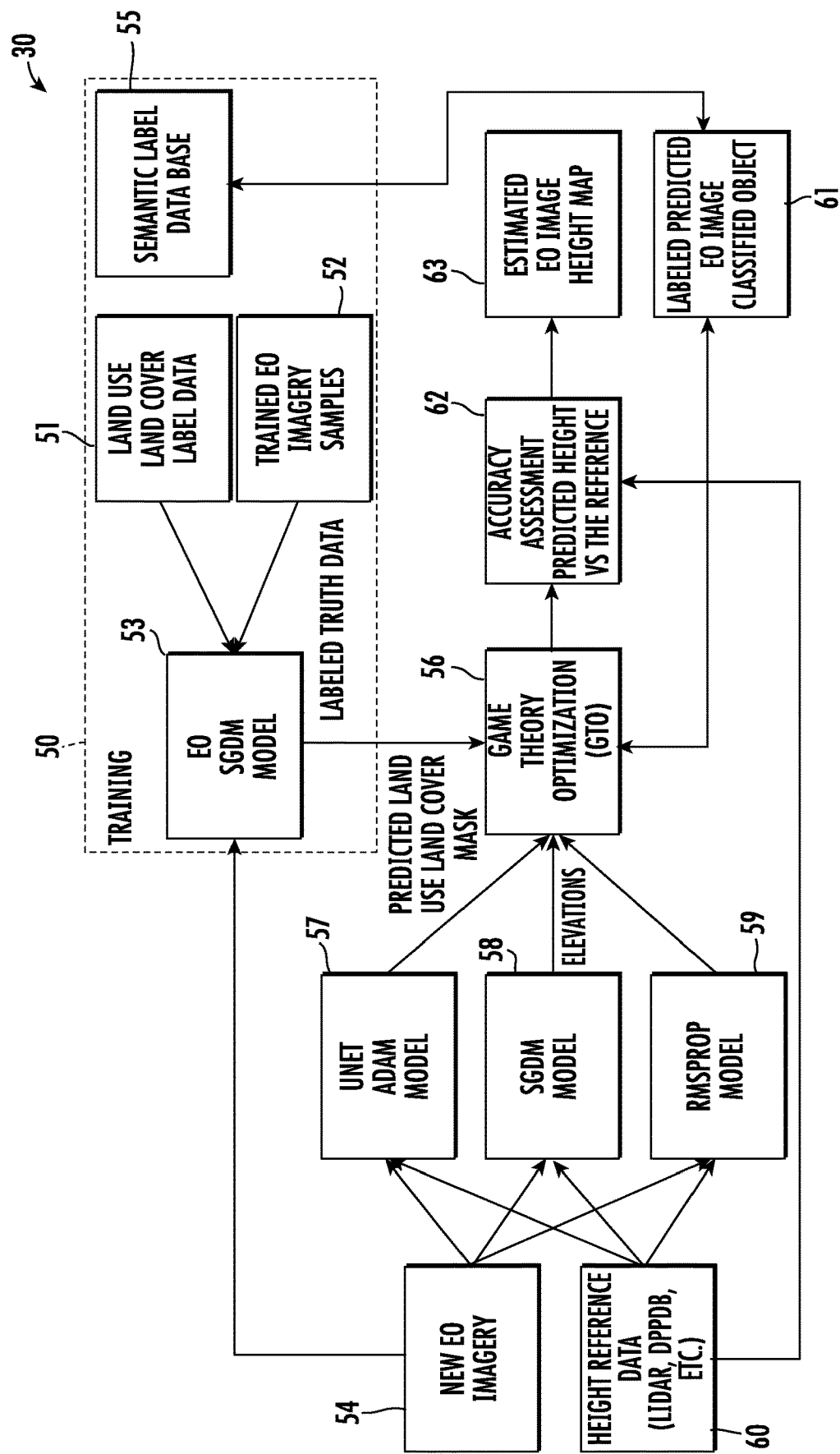
FIG. 3 is a schematic block diagram illustrating an example implementation of the system of FIG. 1.

From the triangulated images, feature parameters may be calculated and updated (Block 442) to generate the multi-modal volume 441 in conjunction with a knowledge base 455 (Q-Learning table), as discussed further above with reference to FIG. 3. A surface extraction (e.g., DSM, etc.) may be performed from the volume 453 (Block 424), and new images 425 registered to the extracted surface (Block 426) using the above-noted predictive registration process. Predictive registration is the process that brings a new image into alignment by registering an image with its volumetric prediction. Rather than using patches as in triangulation, the predictive registration advantageously utilizes the whole volume 453 to make predictions based upon the geometry provided by the volume based upon image collections that have been incorporated therein.

In some embodiments, micro registration may also be used as an additional refinement technique, which is similar to predictive registration but utilizes the original image information in the refinement process. Micro registration helps compensate for inaccuracies in interpolation.

Figure 28:
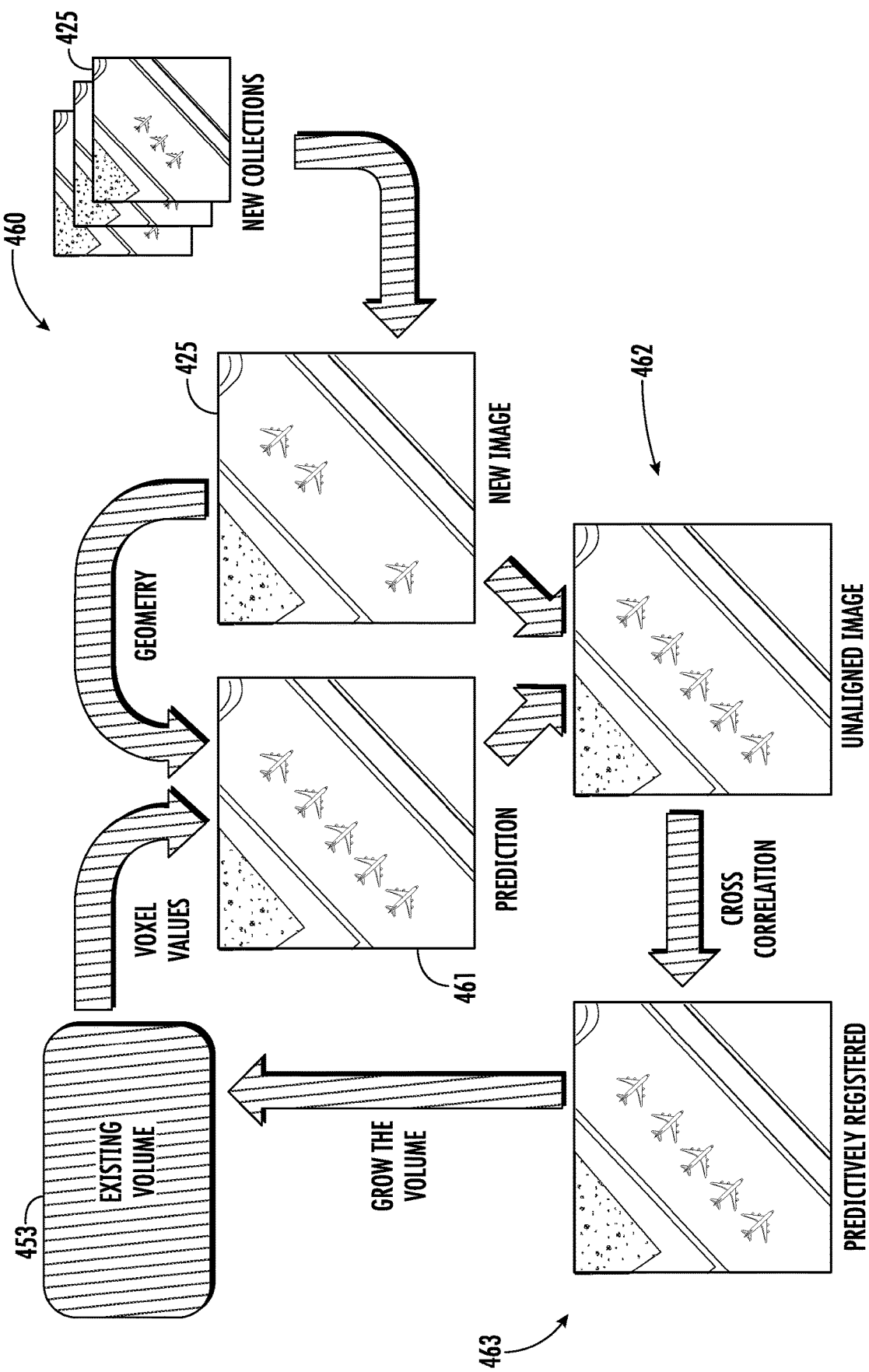
FIG. 28 is a schematic block diagram illustrating the predictive image registration operations of the configuration of FIG. 27 in accordance with an example embodiment.

In the example of FIG. 28, voxel values from the existing volume 453 are used to determine or predict (Block 427) a reference geospatial image 461 (prediction) based upon the geometry and/or conditions associated with the new image. More particularly, the processor 402 may extract the geospatial reference image based upon an image sensor synthetically positioned within the 3D geospatial model corresponding to an image collection orientation, as well as the geometry (e.g., elevation values) of the newly collected geospatial image, as discussed further above. Moreover, the processor 402 may also simulate an atmospheric phenomena within the reference geospatial image corresponding to an atmospheric phenomena at a time of image capture of the newly collected geospatial image, as also discussed above.

The processor 402 may be configured to align the newly collected image and the reference geospatial image based upon cross-correlating voxels within the newly collected geospatial image with voxels in the reference geospatial image, and then update/grow the volume 453 using the predictively registered image. As changes are detected from newly collected images 425 (Block 428) and the volume 453 is updated (Block 429), averaging more absolute responses into the volume improves volume location accuracy. In the example of FIG. 28, an unaligned image 463 is represented by the new image 425 shown superimposed over the predicted geospatial reference image 461 for illustrational purposes. Moreover, the predictively registered image 462 is illustratively represented in FIG. 28 as the new image 425 superimposed over the geospatial reference image 461, but in proper alignment therewith.

In the illustrated example, several planes are in a line on a runway, and in the unaligned image 462 the planes and the edges of the runway are out of alignment, whereas in the predictively registered image 463 they are in alignment. In the images 462, 463, the cross-correlation metric between the image and its prediction is shown. Adjustments are made based on how far the peak value in each of these images 462, 463 is from one another. It should be noted that other suitable approaches for determining statistical similarities or correlation between images besides cross-correlation may be used in different embodiments, as will be appreciated by those skilled in the art.

Additionally, the processor 402 may be further configured to perform change detection (Block 428) for the predictively registered image 463 based upon semantic change detection using deep learning. For example, the change detection may be based upon 3D elevational model differences, two-dimensional (2D) multi-modal imagery content changes, voxel-level historical volumetric attribution, etc., as discussed further above. The processor 402 may also determine and recommend optimal next image collections to be taken (Block 456), as well as performing Advanced Baseline Imager (ABI) product generation (Block 430) in some embodiments, as will be appreciated by those skilled in the art. As a result of the enhanced alignment accuracy of the volume 453 resulting from the predictive registration of new images (and optionally iterative predictive registration of existing images in the volume, as will be discussed further below), this advantageously allows the change detection process to be mostly or fully automated. Additionally, any new image 425 that is assimilated into the volume 453 remains in the volume in a form so that the original may later be reproduced, if desired.

Figure 29:
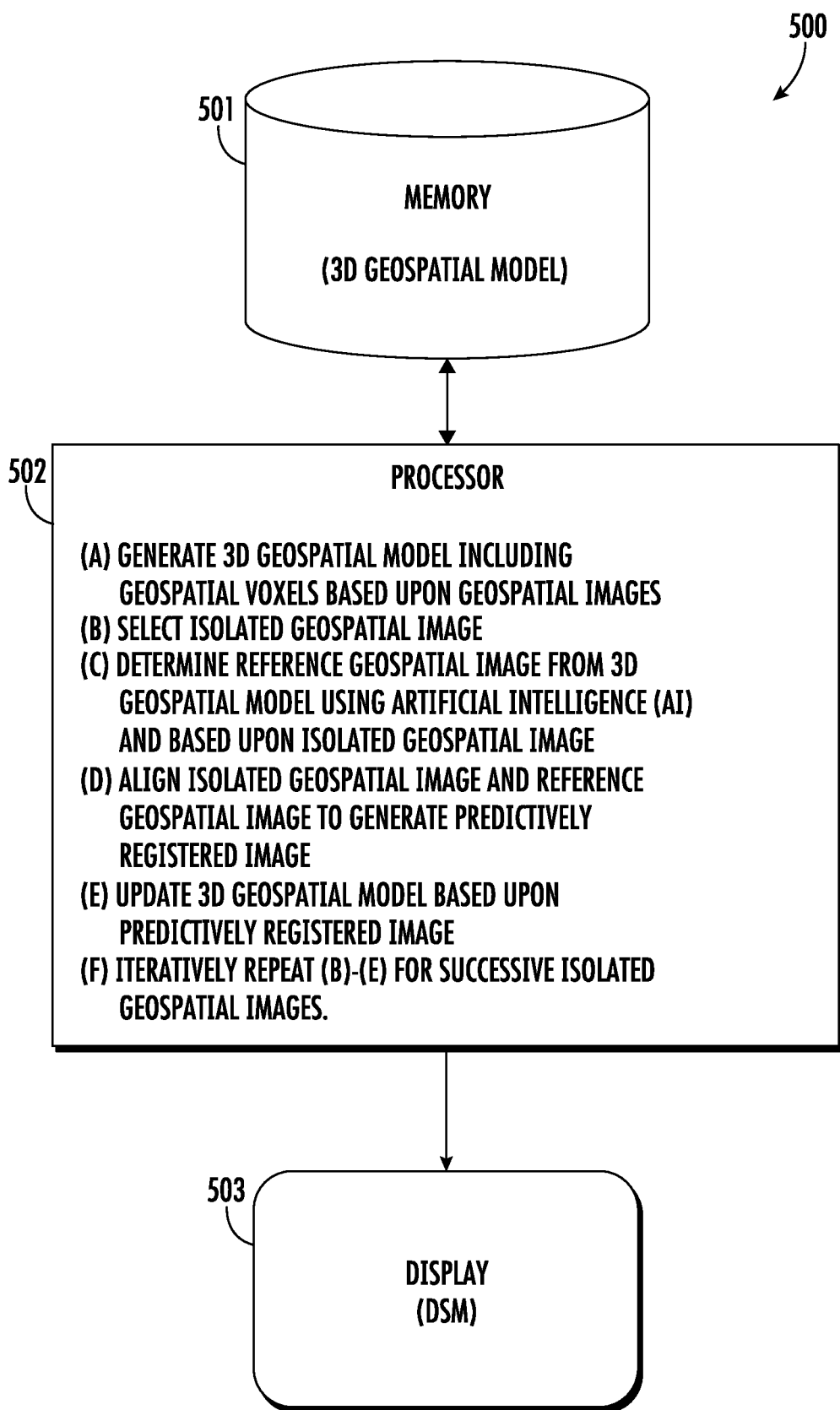
FIG. 29 is schematic block diagram of a system for iterative predictive registration of images within a multi-modality volume in accordance with an example embodiment.
Figure 30:
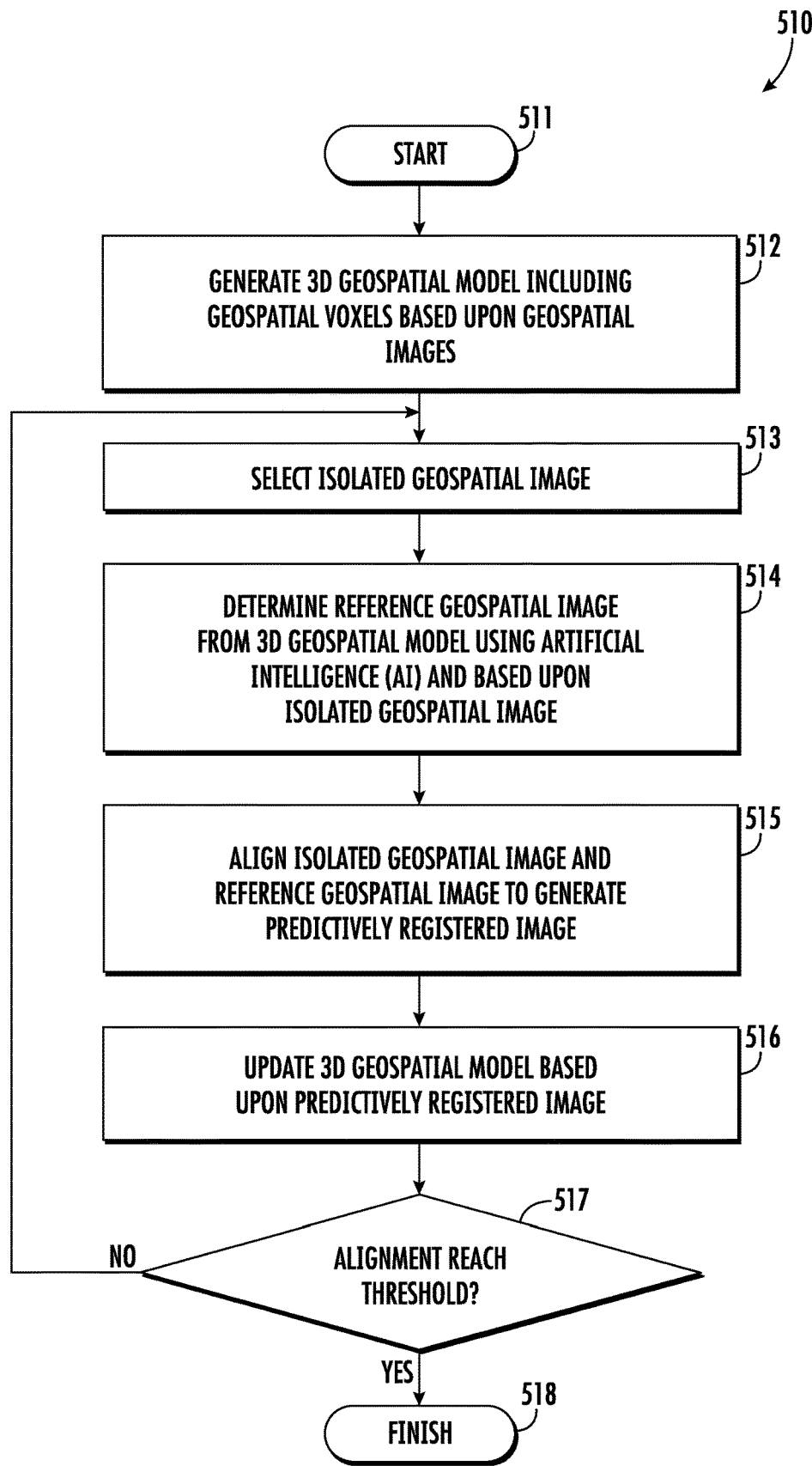
FIG. 30 is a flow diagram illustrating example method aspects associated with the system of FIG. 29.
Figure 31:
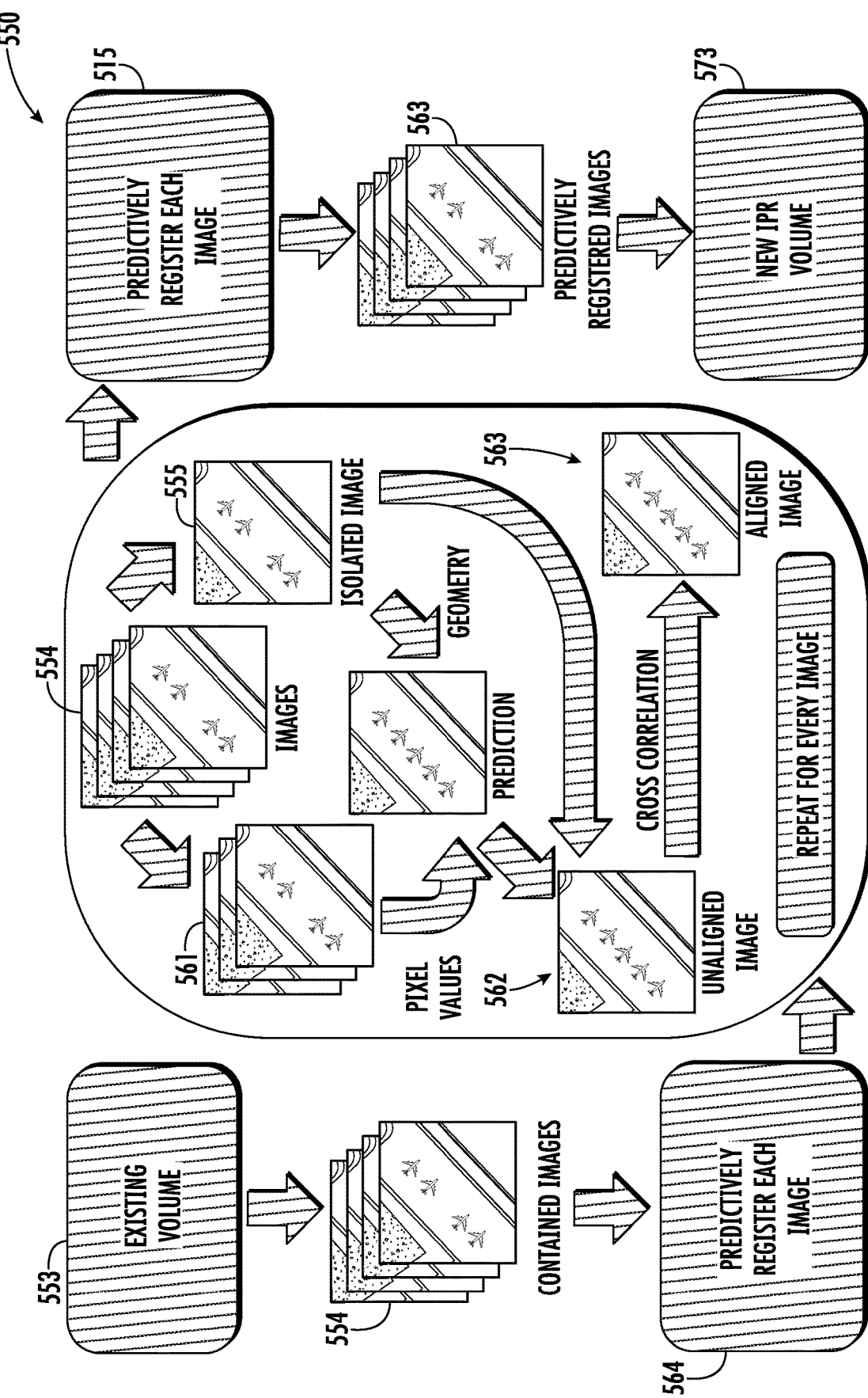
FIG. 31 is a schematic block diagram of an example configuration of the system of FIG. 29.

Referring additionally to FIGS. 29-31, a geospatial modeling system 500 and associated method aspects for updating an existing volume 553 by iteratively re-registering predictively registered images is now described. The system 500 illustratively includes a memory 501 and processor 502, similar to those described above. Beginning at Block 511 of the flow diagram 510, the processor 501 is configured to (a) generate a 3D geospatial model (e.g., DSM, etc.) from the multi-modal volume 553 including geospatial voxels and based upon a plurality of geospatial images 554 contained in the volume (Block 512). The processor 502 further (b) selects an isolated geospatial image 555 from among the plurality of geospatial images 554 (Block 413), (c) determines a reference geospatial image 561 (prediction) from the 3D geospatial model using AI and based upon the isolated geospatial image (Block 514), and (d) aligns the isolated geospatial image and the reference geospatial image (see unaligned image 562 in FIG. 31) to generate a predictively registered image 563, at Block 515. The processor 502 may then (e) update the volume 553 and its associated 3D geospatial model based upon the predictively registered image (Block 516), and (f) iteratively repeat steps (b)-(e) for successive isolated geospatial images 555, e.g., until an alignment for each image reaches a threshold (Block 517). The method of FIG. 30 illustratively concludes at Block 518. Here again, the geospatial model may be output to a display 503 by the processor 502 as discussed above.

In this regard, the present approach is similar to the predictive registration of a new image 425 to the existing volume 453 as discussed above, but here the same processes is being applied to predictively register contained images 554 (Block 564) already incorporated in the volume 553 (e.g., an initial triangulation alignment) in an iterative fashion until an error of alignment falls below a desired threshold. This results in a new or updated version of an iterative predictive registration (IPR) volume 573 (see FIG. 31). Of course, the processor 502 may then further incorporate new images into the new IPR volume 573 as discussed above, and even iteratively predictively register all of the contained images 554 once again after the new predictively registered image is added to the volume (i.e., after it becomes a contained image) for even further alignment accuracy. Again, the greater the alignment accuracy of the new IPR volume 573, the better that automated change detection works, as discussed above.

Figure 32:
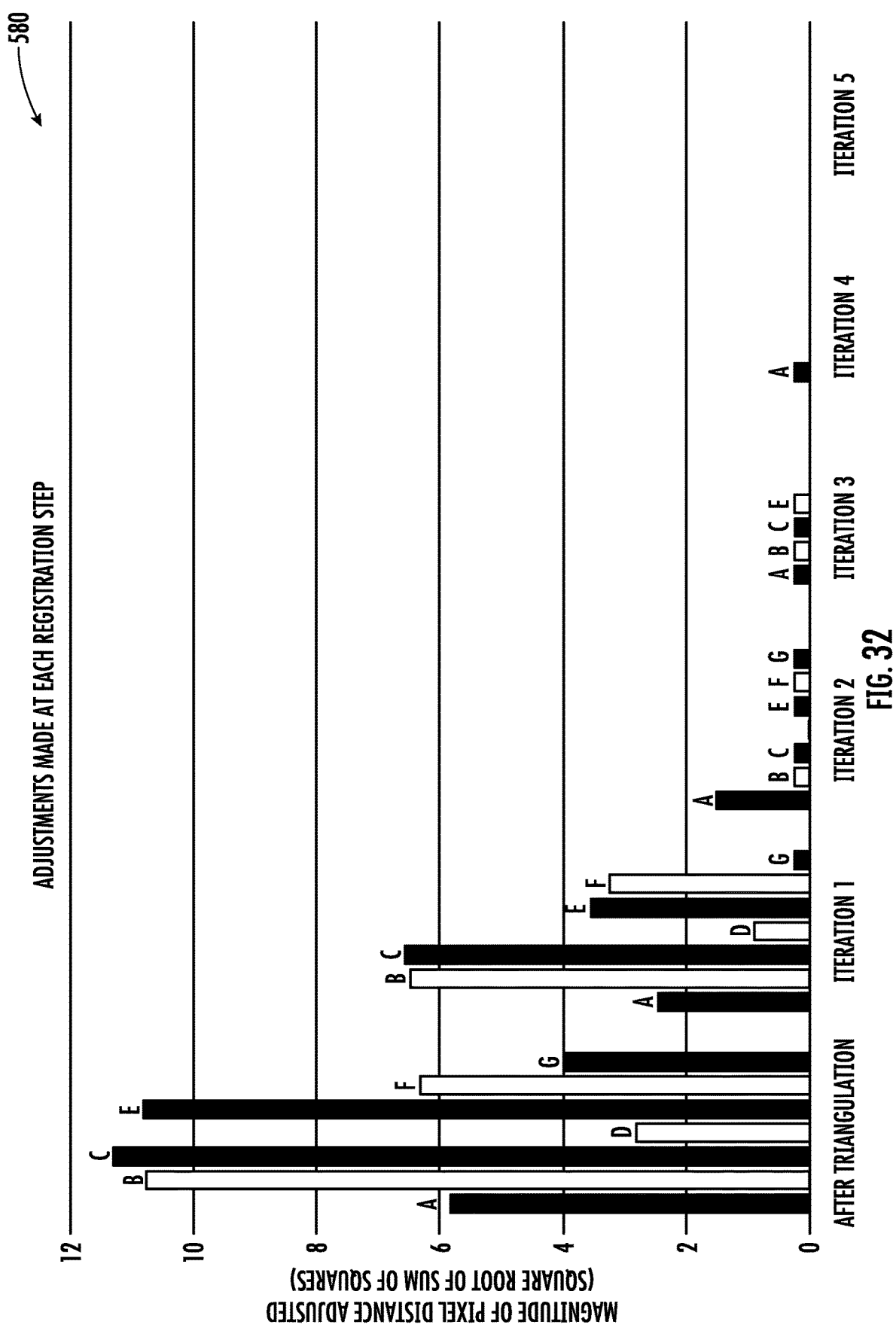
FIG. 32 is a graph of magnitude of pixel distance adjusted vs. iterations associated with the iterative image registration operations of FIG. 31 in an example embodiment.

The foregoing will be further understood with reference to an example implementation now described with reference to the graph 580 of FIG. 32. In the illustrated example, there are six images (A-G) in the existing volume 553. The magnitude of pixel or voxel distance adjusted (represented as the square root of the sum of squares) is represented on the vertical axis in the graph 580, while the iteration cycle number is represented on the horizontal axis. Starting with the initial registration of the images to the volume 553 using triangulation, with each successive iteration of predictive registration for each of the images A-G, the amount of adjustment (and, accordingly, the error in alignment) drops significantly, such that the alignment error is effectively zero by the fifth iteration, as shown.

A related non-transitory computer-readable medium is provided having computer-executable instructions for causing a processor 402 to perform steps including generating a 3D geospatial model including geospatial voxels based upon a plurality of geospatial images, obtaining a newly collected geospatial image, and determining a reference geospatial image from the 3D geospatial model using AI and based upon the newly collected geospatial image. The steps may further include aligning the newly collected geospatial image and the reference geospatial image to generate a predictively registered image, and updating the 3D geospatial model based upon the predictively registered image.

Another related non-transitory computer-readable medium is also provided having computer executable instructions for causing a processor 502 to perform steps including: (a) generating a three-dimensional (3D) geospatial model including geospatial voxels based upon a plurality of geospatial images; (b) selecting an isolated geospatial image from among the plurality of geospatial images; (c) determining a reference geospatial image from the 3D geospatial model using Artificial Intelligence (AI) and based upon the isolated geospatial image; (d) aligning the isolated geospatial image and the reference geospatial image to generate a predictively registered image; (e) updating the 3D geospatial model based upon the predictively registered image; and (f) iteratively repeating (b)-(e) for successive isolated geospatial images.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A geospatial modeling system comprising:
a memory and a processor cooperating therewith to
    (a) generate a three-dimensional (3D) geospatial model including geospatial voxels based upon a plurality of geospatial images,
    (b) select an isolated geospatial image from among the plurality of geospatial images,
    (c) determine a reference geospatial image from the 3D geospatial model using a game theoretic optimization (GTO) from an ensemble of deep learning models and based upon the isolated geospatial image,
    (d) align the isolated geospatial image and the reference geospatial image to generate a predictively registered image,
    (e) perform image semantic segmentation for the reference geospatial image to classify land use/land cover (LULC) features therein,
    (f) update the 3D geospatial model based upon the predictively registered image and classified LULC features, and
    (g) iteratively repeat (b)-(f) for successive isolated geospatial images.

2. The system of claim 1 wherein the processor is configured to iteratively repeat (b)-(f) until an alignment in (d) reaches a threshold.

3. The system of claim 1 wherein the processor is configured to align the isolated geospatial image and the reference geospatial image based upon cross-correlating voxels within the isolated geospatial image with voxels in the reference geospatial image.

4. The system of claim 1 wherein the processor is configured to generate the 3D geospatial model based upon multi-modal collected geospatial images.

5. The system of claim 1 wherein the processor is configured to determine the reference geospatial image based upon an image sensor synthetically positioned within the 3D geospatial model corresponding to an image collection orientation of the isolated geospatial image.

6. The system of claim 1 wherein the processor is configured to simulate an atmospheric phenomena within the reference geospatial image corresponding to an atmospheric phenomena at a time of image capture of the isolated geospatial image, and to perform the alignment further based upon the simulated atmospheric phenomena.

7. The system of claim 1 wherein the processor is configured to:
    obtain a newly collected geospatial image;
    determine a reference geospatial image from the 3D geospatial model using AI and based upon the newly collected geospatial image;
    align the newly collected geospatial image and the reference geospatial image to generate a new predictively registered image; and
    update the 3D geospatial model based upon the new predictively registered image.

8. The system of claim 1 wherein the processor is configured to generate the 3D geospatial model based upon triangulation grouping of voxels between the plurality of geospatial images.

9. A geospatial modeling method comprising:
using a processor and associated memory for
    (a) generating a three-dimensional (3D) geospatial model including geospatial voxels based upon a plurality of geospatial images and storing the 3D geospatial model in a memory,
    (b) selecting an isolated geospatial image from among the plurality of geospatial images, (c) determining a reference geospatial image from the 3D geospatial model using a game theoretic optimization (GTO) from an ensemble of deep learning models and based upon the isolated geospatial image, (d) aligning the isolated geospatial image and the reference geospatial image to generate a predictively registered image, (e) performing image semantic segmentation for the reference geospatial image to classify land use/land cover (LULC) features therein, (f) updating the 3D geospatial model based upon the predictively registered image and classified LULC features, and (g) iteratively repeating (b)-(f) for successive isolated geospatial images.

10. The method of claim 9 wherein (g) comprises iteratively repeating (b)-(f) until an alignment in (d) reaches a threshold.

11. The method of claim 9 wherein (c) comprises aligning the isolated geospatial image and the reference geospatial image based upon cross-correlating voxels within the isolated geospatial image with voxels in the reference geospatial image.

12. The method of claim 9 wherein (a) comprises generating the 3D geospatial model based upon multi-modal collected geospatial images.

13. The method of claim 9 wherein (c) comprises determining the reference geospatial image based upon an image sensor synthetically positioned within the 3D geospatial model corresponding to an image collection orientation of the isolated geospatial image.

14. The method of claim 9 comprising using the processor for simulating an atmospheric phenomena within the reference geospatial image corresponding to an atmospheric phenomena at a time of image capture of the isolated geospatial image; and wherein (d) comprises aligning the isolated geospatial image and the reference geospatial image further based upon the simulated atmospheric phenomena.

15. The method of claim 9 comprising using the processor for:

obtaining a newly collected geospatial image;

determining a reference geospatial image from the 3D geospatial model using AI and based upon the newly collected geospatial image;

aligning the newly collected geospatial image and the reference geospatial image to generate a new predictively registered image; and updating the 3D geospatial model based upon the new predictively registered image.

16. The method of claim 9 wherein (a) comprises generating the 3D geospatial model based upon triangulation grouping of voxels between the plurality of geospatial images.

17. A non-transitory computer-readable medium having computer executable instructions for causing a processor to perform steps comprising:

(a) generating a three-dimensional (3D) geospatial model including geospatial voxels based upon a plurality of geospatial images;

(b) selecting an isolated geospatial image from among the plurality of geospatial images;

(c) determining a reference geospatial image from the 3D geospatial model using a game theoretic optimization (GTO) from an ensemble of deep learning models and based upon the isolated geospatial image;

(d) aligning the isolated geospatial image and the reference geospatial image to generate a predictively registered image;

(e) performing image semantic segmentation for the reference geospatial image to classify land use/land cover (LULC) features therein, (f) updating the 3D geospatial model based upon the predictively registered image and classified LULC features; and (g) iteratively repeating (b)-(f) for successive isolated geospatial images.

18. The non-transitory computer-readable medium of claim 17 wherein (g) comprises iteratively repeating (b)-(f) until an alignment in (d) reaches a threshold.

19. The non-transitory computer-readable medium of claim 17 wherein (d) comprises aligning the isolated geospatial image and the reference geospatial image based upon cross-correlating voxels within the isolated geospatial image with voxels in the reference geospatial image.

20. The non-transitory computer-readable medium of claim 17 wherein (a) comprises generating the 3D geospatial model based upon multi-modal collected geospatial images.

21. The non-transitory computer-readable medium of claim 17 wherein (c) comprises determining the reference geospatial image based upon an image sensor synthetically positioned within the 3D geospatial model corresponding to an image collection orientation of the isolated geospatial image.

22. The non-transitory computer-readable medium of claim 17 wherein the steps comprise causing the processor to perform a step of simulating an atmospheric phenomena within the reference geospatial image corresponding to an atmospheric phenomena at a time of image capture of the isolated geospatial image; and wherein (d) comprises aligning the isolated geospatial image and the reference geospatial image further based upon the simulated atmospheric phenomena.

23. The non-transitory computer-readable medium of claim 17 wherein the steps comprise:

obtaining a newly collected geospatial image;

determining a reference geospatial image from the 3D geospatial model using AI and based upon the newly collected geospatial image;

aligning the newly collected geospatial image and the reference geospatial image to generate a new predictively registered image; and updating the 3D geospatial model based upon the new predictively registered image.

24. The non-transitory computer-readable medium of claim 17 wherein (a) comprises generating the 3D geospatial model based upon triangulation grouping of voxels between the plurality of geospatial images.

* * * * *